(12) United States Patent
Choi et al.

(10) Patent No.: US 12,227,134 B2
(45) Date of Patent: Feb. 18, 2025

(54) VEHICLE IMAGE PROCESSING DEVICE AND METHOD FOR DISPLAYING VISUAL INFORMATION ON DISPLAY INCLUDED IN VEHICLE

(71) Applicant: LG ELECTRONICS INC., Seoul (KR)

(72) Inventors: Sunghwan Choi, Seoul (KR); Namyong Park, Seoul (KR); Dukyung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 758 days.

(21) Appl. No.: 17/469,263

(22) Filed: Sep. 8, 2021

(65) Prior Publication Data

US 2022/0080829 A1 Mar. 17, 2022

(30) Foreign Application Priority Data

Sep. 14, 2020 (WO) ................ PCT/KR2020/012389

(51) Int. Cl.
*B60R 1/27* (2022.01)
*B60R 11/04* (2006.01)
(Continued)

(52) U.S. Cl.
CPC ................ *B60R 1/27* (2022.01); *B60R 11/04* (2013.01); *H04N 23/61* (2023.01);
(Continued)

(58) Field of Classification Search
CPC .... H04N 23/61; H04N 23/632; H04N 23/635; H04N 23/698; G06T 7/292; G06T 7/70;
(Continued)

(56) References Cited

U.S. PATENT DOCUMENTS 9,191,574 B2 * 11/2015 McMahon ........... H04N 21/422
10,807,533 B2 * 10/2020 Chae ..................... G06V 20/58
(Continued)

FOREIGN PATENT DOCUMENTS

JP 4893212 3/2012
KR 1020190064383 6/2019
(Continued)

OTHER PUBLICATIONS

Extended European Search Report in European Appln. No. 20953408.0, mailed on Dec. 7, 2023, 12 pages.
(Continued)

*Primary Examiner* — Twyler L Haskins
*Assistant Examiner* — John H Morehead, III
(74) *Attorney, Agent, or Firm* — Fish & Richardson P.C.

(57) ABSTRACT

An image processing device and an image processing method are disclosed. The image processing device includes a memory storing a first image transmitted from a first camera and a second image transmitted from a second camera with a wider view angle than the first camera, and a processor processing the first and second images. When a target is specified in a first area in which the first image and the second image overlap each other within an augmented reality screen generated based on at least one of the first and second images, the processor extracts target information on the target based on data for the first image, and generate augmented reality data based on the target information so that a visual object corresponding to the target is displayed on the first area.

17 Claims, 35 Drawing Sheets

(51) Int. Cl.
*H04N 23/61* (2023.01)
*H04N 23/63* (2023.01)
*H04N 23/698* (2023.01)

(52) U.S. Cl.
CPC ......... *H04N 23/632* (2023.01); *H04N 23/635* (2023.01); *H04N 23/698* (2023.01)

(58) Field of Classification Search
CPC . G06T 2207/10004; G06T 2207/10016; G06T 2207/10048; G06T 2207/30252; G06F 3/048; G06F 3/14; B60R 1/27; B60R 11/04
See application file for complete search history.

(56) References Cited

U.S. PATENT DOCUMENTS

| | | | | |
|---|---|---|---|---|
| 11,030,468 | B2* | 6/2021 | Shimazu | G06T 7/187 |
| 11,227,409 | B1* | 1/2022 | Wu | H04N 17/002 |
| 2010/0253780 | A1* | 10/2010 | Li | B60R 1/28 |
| | | | | 348/148 |
| 2012/0069181 | A1 | 3/2012 | Xue et al. | |
| 2016/0159281 | A1* | 6/2016 | Jang | H04N 7/181 |
| | | | | 348/148 |
| 2017/0098131 | A1 | 4/2017 | Shashua et al. | |
| 2019/0004533 | A1 | 1/2019 | Huang et al. | |
| 2022/0176819 | A1* | 6/2022 | Yamamoto | B60R 1/27 |

FOREIGN PATENT DOCUMENTS

| | | |
|---|---|---|
| KR | 1020200006556 | 1/2020 |
| WO | WO 2017/209313 | 12/2017 |
| WO | WO 2019/198998 | 10/2019 |

OTHER PUBLICATIONS

PCT International Search Report in International Appln. No. PCT/KR2020/012389, dated Jun. 18, 2021, 6 pages (with English translation).

\* cited by examiner

FIG. 8
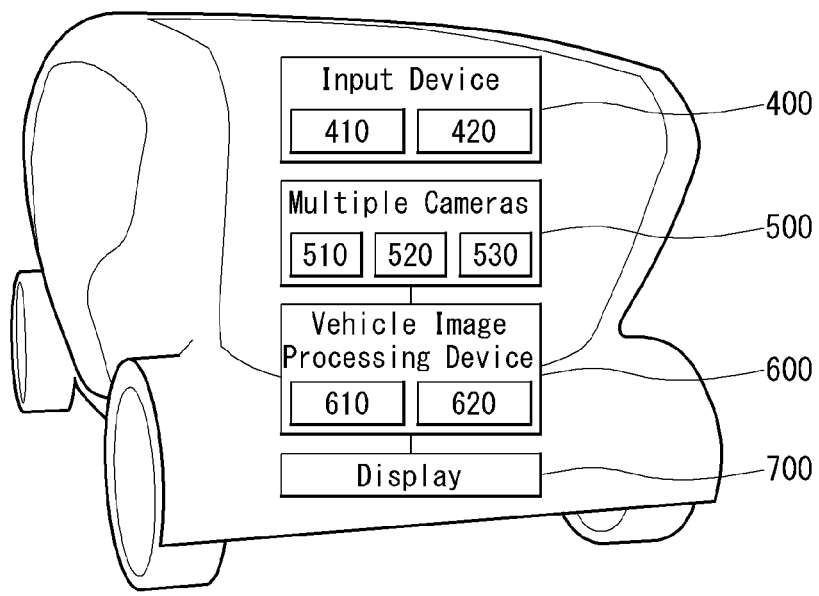
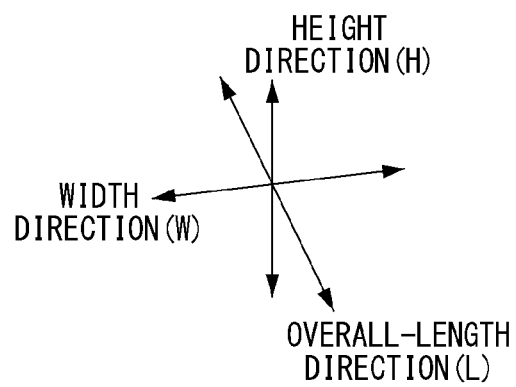

FIG. 30

| Implementation | Coordinate estimation and visibility improvement application | Visual information output without visibility improvement |
|---|---|---|
| Application process | First camera (510) + Second camera (520) + Third camera (530) | First camera (510) + Second camera (520) |
| Classification | "Detailed information" | "Rough Information" |
| Input Information | Eye tracking, Touch | Gesture recognition, Voice recognition |

VEHICLE IMAGE PROCESSING DEVICE AND METHOD FOR DISPLAYING VISUAL INFORMATION ON DISPLAY INCLUDED IN VEHICLE

CROSS-REFERENCE TO RELATED APPLICATIONS

This application is based on and claims priority under 35 U.S.C. 119 to international application No. PCT/KR2020/012389, filed on Sep. 14, 2020, the disclosure of which is herein incorporated by reference in its entirety.

TECHNICAL FIELD

The present disclosure relates to a vehicle image processing device and a method for displaying visual information on a display included in a vehicle. More specifically, the present disclosure relates to image processing using a plurality of cameras with different view angles and a method for displaying an image according to the image processing on a vehicle display.

BACKGROUND

An autonomous vehicle refers to a vehicle that can drive itself without an operation of a driver or a passenger. An automated vehicle & highway system refers to systems that monitors and controls an autonomous vehicle so that the autonomous vehicle can drive itself.

Users using vehicles as well as autonomous vehicles can use a plurality of cameras including an advanced driver assistance systems (ADAS) camera. In particular, self-driving using the ADAS camera included in the vehicle has been recently applied to most vehicles.

However, since the ADAS camera has a relatively small view angle for the efficiency, there was a problem that it was difficult to combine and process an image obtained from the ADAS camera and an image obtained from a general camera.

In particular, when a target sensed by the ADAS camera is displayed together with an image obtained from the general camera, there was a problem in that the target can be displayed only in an overlapping area between the general camera and the ADAS camera, and tracking to the target sensed by the ADAS camera is stopped in a non-overlapping area.

SUMMARY

An object of the present disclosure is to provide an image processing device using images obtained from a plurality of cameras with different view angles and a method thereof.

Another object of the present disclosure is to provide a means for combining images obtained from a plurality of cameras with different view angles and displaying visual information for a target on an area in which the images do not overlap.

Another object of the present disclosure is to provide a means for obtaining coordinate information of a target sensed by a plurality of cameras with different view angles and predicting coordinate information when the sensed target moves to a non-overlapping area.

Another object of the present disclosure is to provide a means capable of continuously tracking a position of a target even if the target moves to an area outside a measurable area of a sensor capable of detecting the position of the target.

Another object of the present disclosure is to provide a means for obtaining an intention of a passenger for selection of a target obtaining coordinate information and obtaining the target therefrom.

Another object of the present disclosure is to improve driver visibility by configuring a screen through association of images taken by a plurality of cameras.

Another object of the present disclosure is to allow passengers to get more conveniently necessary information from the screen by achieving the above-described objects and to promote safe driving and user convenience.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

In order to achieve the above-described and other objects, in one aspect of the present disclosure, there is provided an image processing device comprising a memory configured to store a first image transmitted from a first camera and a second image transmitted from a second camera with a wider view angle than the first camera; and a processor configured to process the first and second images stored in the memory, wherein the processor is configured to, when a target is specified in a first area in which the first image and the second image overlap each other within an augmented reality screen generated based on at least one of the first and second images, extract target information on the target based on data for the first image; generate augmented reality data based on the extracted target information so that a visual object corresponding to the target is displayed on the first area; and when the target gets out of the first area and enters a second area of the augmented reality screen, track a position of the target based on the extracted target information and generate the augmented reality data so that the visual object is displayed on the second area.

In another aspect of the present disclosure, there is provided an image processing method comprising receiving a first image and a second image from a first camera and a second camera with a wider view angle than the first camera, respectively; when a target is specified in a first area in which the first image and the second image overlap each other within an augmented reality screen generated based on at least one of the first and second images, extracting target information on the target based on data for the first image; generating augmented reality data based on the extracted target information so that a visual object corresponding to the target is displayed on the first area; and when the target gets out of the first area and enters a second area of the augmented reality screen, tracking a position of the target based on the extracted target information and generating the augmented reality data so that the visual object is displayed on the second area.

In another aspect of the present disclosure, there is provided an image processing device comprising a first camera configured to output a first image; a second camera configured to output a second image with a wider view angle than the first camera; a memory configured to store the first image and the second image; a processor configured to generate an augmented reality screen based on at least one of the first and second images stored in the memory and generate augmented reality data for a specified target in the first image; and a display configured to display the augmented reality data by overlapping the augmented reality data with the augmented reality screen, wherein the processor is further configured to, when the target is specified in a first area in which the first image and the second image overlap each other within the augmented reality screen, extract target information on the target based on data for the first image; generate the augmented reality data based on the extracted target information so that a visual object corresponding to the target is displayed on the first area; and when the target gets out of the first area and enters a second area of the augmented reality screen, track a position of the target based on the extracted target information and generate the augmented reality data so that the visual object is displayed on the second area.

The present disclosure has an effect of providing an image processing device using images obtained from a plurality of cameras with different view angles and a method thereof.

The present disclosure has an effect of providing a means for combining images obtained from a plurality of cameras with different view angles and displaying visual information for a target on an area in which the images do not overlap.

The present disclosure has an effect of providing a means for obtaining coordinate information of a target sensed by a plurality of cameras with different view angles and predicting coordinate information when the sensed target moves to a non-overlapping area.

The present disclosure has an effect of providing a means for obtaining an intention of a passenger for selection of a target obtaining coordinate information and obtaining the target therefrom.

The present disclosure has an effect of allowing passengers to get more conveniently necessary information from the screen by achieving the above-described objects and promoting safe driving and user convenience.

Effects that could be achieved with the present disclosure are not limited to those that have been described hereinabove merely by way of example, and other effects and advantages of the present disclosure will be more clearly understood from the following description by a person skilled in the art to which the present disclosure pertains.

BRIEF DESCRIPTION OF THE DRAWINGS

The accompanying drawings, which are included to provide a further understanding of the present disclosure and constitute a part of the detailed description, illustrate embodiments of the present disclosure and serve to explain technical features of the present disclosure together with the description.

FIG. 8 illustrates a vehicle image processing device and a vehicle including the same according to an embodiment of the present disclosure.

FIGS. 30 and 31 illustrate detailed implementations for visibility improvement in the present disclosure.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings.

The terms including an ordinal number such as first, second, etc. may be used to describe various components, but the components are not limited by such terms. The terms are used only for the purpose of distinguishing one component from other components.

When any component is described as "being connected" or "being coupled" to other component, this should be understood to mean that another component may exist between them, although any component may be directly connected or coupled to the other component. In contrast, when any component is described as "being directly connected" or "being directly coupled" to other component, this should be understood to mean that no component exists between them.

A singular expression can include a plural expression as long as it does not have an apparently different meaning in context.

Figure 1:
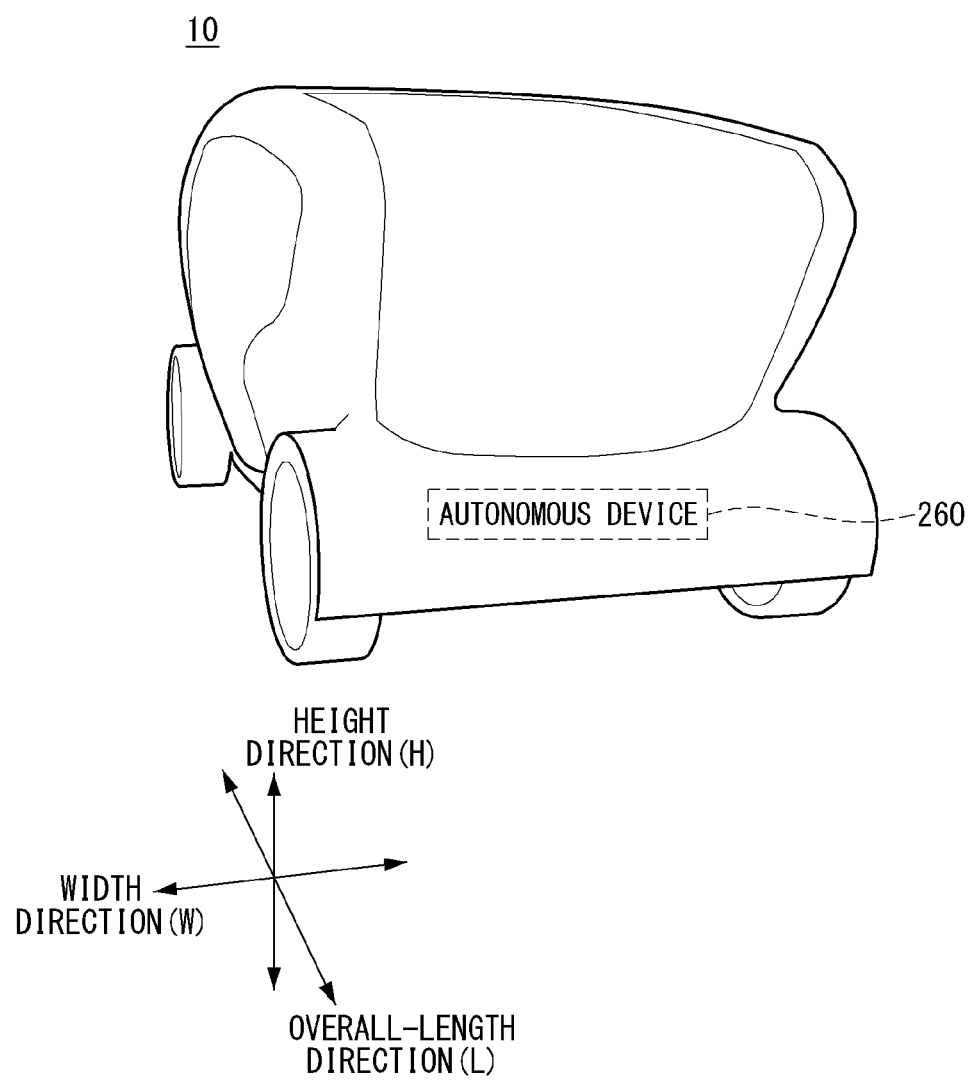
FIG. 1 illustrates a vehicle according to an embodiment of the present disclosure.

In the present disclosure, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof Driving (1) Exterior of Vehicle FIG. 1 illustrates a vehicle according to an embodiment of the present disclosure.

Referring to FIG. 1, a vehicle 10 according to an embodiment of the present disclosure is defined as a transportation means traveling on roads or railroads. The vehicle 10 includes a car, a train, and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

(2) Components of Vehicle

Figure 2:
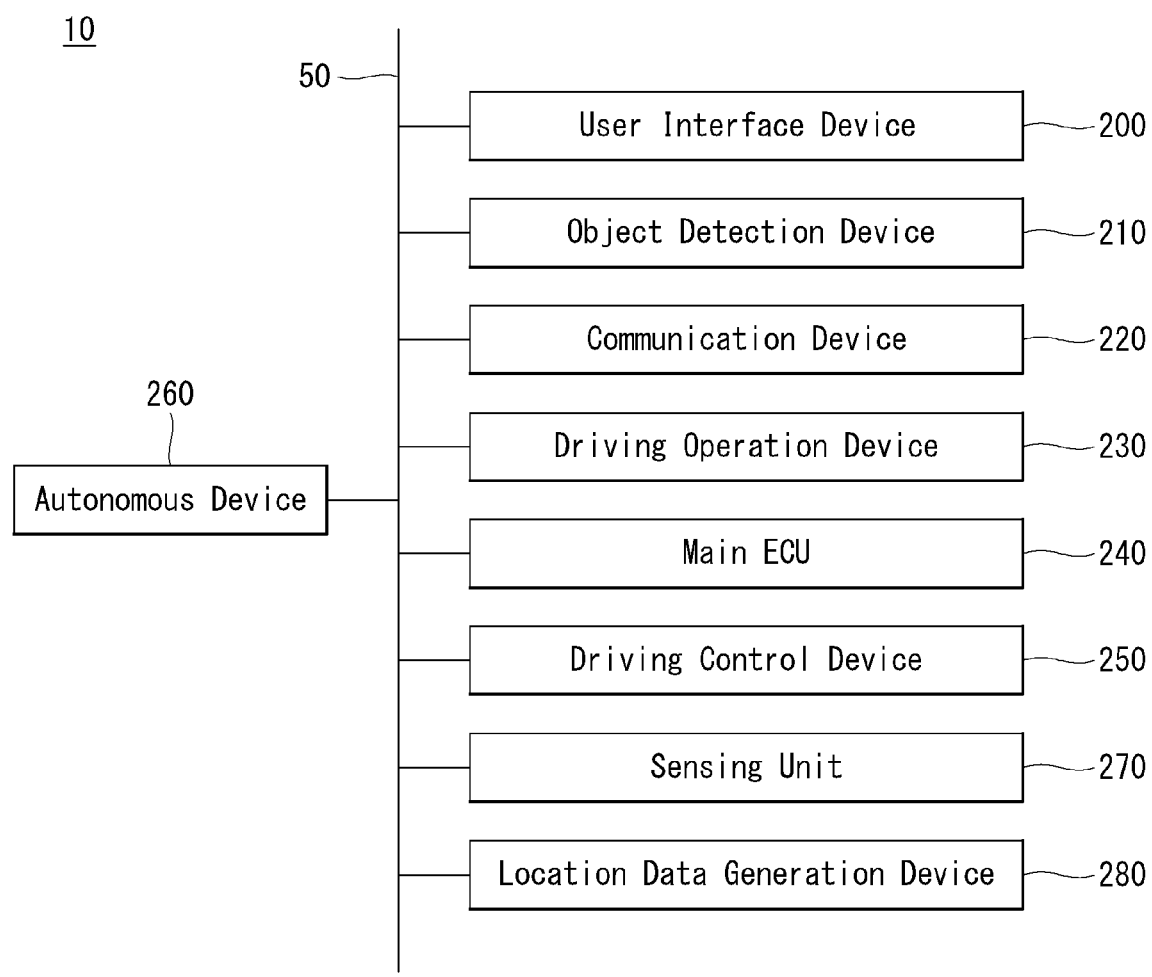
FIG. 2 is a control block diagram of a vehicle according to an embodiment of the present disclosure.

FIG. 2 is a control block diagram of a vehicle according to an embodiment of the present disclosure.

Referring to FIG. 2, a vehicle 10 may include a user interface device 200, an object detection device 210, a communication device 220, a driving operation device 230, a main ECU 240, a driving control device 250, an autonomous device 260, a sensing unit 270, and a location data generation device 280. Each of the object detection device 210, the communication device 220, the driving operation device 230, the main ECU 240, the driving control device 250, the autonomous device 260, the sensing unit 270, and the location data generation device 280 may be implemented as an electronic device which generates electric signals and exchange the electric signals from one another.

1) User Interface Device

The user interface device 200 is a device for communication between the vehicle 10 and a user. The user interface device 200 may receive a user input and provide information generated in the vehicle 10 to the user. The vehicle 10 may implement a user interface (UI) or user experience (UX) through the user interface device 200. The user interface device 200 may include an input device, an output device, and a user monitoring device.

2) Object Detection Device

The object detection device 210 may generate information about objects outside the vehicle 10. The information about objects may include at least one of information on presence or absence of the object, location information of the object, information on a distance between the vehicle 10 and the object, and information on a relative speed of the vehicle 10 with respect to the object. The object detection device 210 may detect objects outside the vehicle 10. The object detection device 210 may include at least one sensor which may detect objects outside the vehicle 10. The object detection device 210 may include at least one of a camera, a radar, a lidar, an ultrasonic sensor, and an infrared sensor. The object detection device 210 may provide data for an object generated based on a sensing signal generated from a sensor to at least one electronic device included in the vehicle.

2.1) Camera

The camera can generate information about objects outside the vehicle 10 using images. The camera may include at least one lens, at least one image sensor, and at least one processor which is electrically connected to the image sensor, processes received signals and generates data about objects based on the processed signals.

The camera may be at least one of a mono camera, a stereo camera and an around view monitoring (AVM) camera. The camera can acquire location information of objects, information on distances to objects, or information on relative speeds with respect to objects using various image processing algorithms. For example, the camera can acquire information on a distance to an object and information on a relative speed with respect to the object from an acquired image based on change in the size of the object over time. For example, the camera may acquire information on a distance to an object and information on a relative speed with respect to the object through a pin-hole model, road profiling, or the like. For example, the camera may acquire information on a distance to an object and information on a relative speed with respect to the object from a stereo image acquired from a stereo camera based on disparity information.

The camera may be attached at a portion of the vehicle at which FOV (field of view) can be secured in order to photograph the outside of the vehicle. The camera may be disposed in proximity to the front windshield inside the vehicle in order to acquire front images of the vehicle. The camera may be disposed near a front bumper or a radiator grill. The camera may be disposed in proximity to a rear glass inside the vehicle in order to acquire rear view images of the vehicle. The camera may be disposed near a rear bumper, a trunk or a tail gate. The camera may be disposed in proximity to at least one of side windows inside the vehicle in order to acquire side view images of the vehicle. Alternatively, the camera may be disposed near a side mirror, a fender or a door.

2.2) Radar

The radar can generate information on an object outside the vehicle using electromagnetic waves. The radar may include an electromagnetic wave transmitter, an electromagnetic wave receiver, and at least one processor which is electrically connected to the electromagnetic wave transmitter and the electromagnetic wave receiver, processes received signals and generates data about an object based on the processed signals. The radar may be implemented as a pulse radar or a continuous wave radar in terms of electromagnetic wave emission. The continuous wave radar may be implemented as a frequency modulated continuous wave (FMCW) radar or a frequency shift keying (FSK) radar according to signal waveform. The radar can detect an object by means of electromagnetic waves based on a time of flight (TOF) method or a phase shift method, and detect a location of the detected object, a distance to the detected object, and a relative speed with respect to the detected object. The radar may be disposed at an appropriate location outside the vehicle in order to detect objects positioned in front of, behind or on the side of the vehicle.

2.3) Lidar

The lidar can generate information about an object outside the vehicle 10 using a laser beam. The lidar may include a light transmitter, a light receiver, and at least one processor which is electrically connected to the light transmitter and the light receiver, processes received signals and generates data about an object based on the processed signal. The lidar may be implemented by the TOF method or the phase shift method. The lidar may be implemented in a driven type or a non-driven type. A driven type lidar may be rotated by a motor and detect an object around the vehicle 10. A non-driven type lidar may detect an object positioned within a predetermined range from the vehicle according to light steering. The vehicle 10 may include a plurality of non-drive type lidars. The lidar can detect an object be means of laser beams based on the TOF method or the phase shift method and detect the location of the detected object, a distance to the detected object, and a relative speed with respect to the detected object. The lidar may be disposed at an appropriate location outside the vehicle in order to detect objects positioned in front of, behind or on the side of the vehicle.

3) Communication Device

The communication device 220 can exchange signals with devices disposed outside the vehicle 10. The communication device 220 can exchange signals with at least one of infrastructure (e.g., a server and a broadcast station), another vehicle, and a terminal. The communication device 220 may include a transmission antenna, a reception antenna, and at least one of a radio frequency (RF) circuit and an RF element, which can implement various communication protocols, in order to perform communication.

The communication device 220 can exchange signals with external devices using vehicle-to-vehicle (V2V) communication technology. The V2V communication may be provided via PC5 interface and/or Uu interface.

The next generation radio access technology may be referred to as new radio access technology (RAT) or new radio (NR). Even in NR, the V2V communication can be supported.

5G NR is a subsequent technology of LTE-A, and is a mobile communication system of new clean-slate type with characteristics such as high capability, low latency, and high flexibility. The 5G NR can utilize all of available spectrum resources including a low frequency band less than 1 GHz, a middle frequency band of 1 GHz to 10 GHz, a high frequency (millimeter) band of 24 GHz or more, etc.

For the clear explanation, the present disclosure is described focusing on LTE-A or 5G NR, but the technical spirit of the present disclosure is not limited thereto.

For example, the communication device may exchange signals with the external devices based on C-V2X (cellular V2X). For example, the C-V2X can include sidelink communication based on LTE and/or sidelink communication based on NR.

For example, the communication device may exchange signals with the external devices based on dedicated short range communications (DSRC) or wireless access in vehicular environment (WAVE) standards based on IEEE 802.11p PHY/MAC layer technology and IEEE 1609 Network/Transport layer technology. The DSRC (or WAVE standards) is communication specifications for providing an intelligent transport system (ITS) service via short-range dedicated communication between vehicle-mounted devices or between a roadside device and a vehicle-mounted device. The DSRC may be a communication scheme that can use a frequency of 5.9 GHz and have a data transfer rate in the range of 3 Mbps to 27 Mbps. IEEE 802.11p may be combined with IEEE 1609 to support DSRC (or WAVE standards).

The communication device according to the present disclosure can exchange signals with the external devices using only one of C-V2X and DSRC. Alternatively, the communication device according to the present disclosure can exchange signals with the external devices using a hybrid of C-V2X and DSRC.

4) Driving Operation Device

The driving operation device 230 is a device for receiving user input for driving. In a manual mode, the vehicle 10 may be driven based on a signal provided by the driving operation device 230. The driving operation device 230 may include a steering input device (e.g., a steering wheel), an acceleration input device (e.g., an acceleration pedal), and a brake input device (e.g., a brake pedal).

5) Main ECU

The main ECU 240 can control the overall operation of at least one electronic device included in the vehicle 10.

6) Driving Control Device

The driving control device 250 is a device for electrically controlling various vehicle driving devices included in the vehicle 10. The driving control device 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device, and a suspension driving control device. The safety device driving control device may include a seat belt driving control device for seat belt control.

The driving control device 250 includes at least one electronic control device (e.g., a control electronic control unit (ECU)).

The driving control device 250 can control vehicle driving devices based on signals received by the autonomous device 260. For example, the driving control device 250 can control a power train, a steering device and a brake device based on signals received by the autonomous device 260.

7) Autonomous Device

The autonomous device 260 can generate a route for self-driving based on acquired data. The autonomous device 260 can generate a driving plan for traveling along the generated route. The autonomous device 260 can generate a signal for controlling movement of the vehicle according to the driving plan. The autonomous device 260 can provide the signal to the driving control device 250.

The autonomous device 260 can implement at least one advanced driver assistance system (ADAS) function. The ADAS can implement at least one of adaptive cruise control (ACC), autonomous emergency braking (AEB), forward collision warning (FCW), lane keeping assist (LKA), lane change assist (LCA), target following assist (TFA), blind spot detection (BSD), high beam assist (HBA), auto parking system (APS), a PD collision warning system, traffic sign recognition (TSR), traffic sign assist (TSA), night vision (NV), driver status monitoring (DSM), and traffic jam assist (TJA).

The autonomous device 260 can perform switching from a self-driving mode to a manual driving mode or switching from the manual driving mode to the self-driving mode. For example, the autonomous device 260 can switch the mode of the vehicle 10 from the self-driving mode to the manual driving mode or from the manual driving mode to the self-driving mode based on a signal received from the user interface device 200.

8) Sensing Unit

The sensing unit 270 can detect a state of the vehicle. The sensing unit 270 may include at least one of an internal measurement unit (IMU) sensor, a collision sensor, a wheel sensor, a speed sensor, an inclination sensor, a weight sensor, a heading sensor, a location module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor, and a magnetic sensor.

The sensing unit 270 can generate vehicle state data based on a signal generated from at least one sensor. The vehicle state data may be information generated based on data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake panel, etc.

9) Location Data Generation Device

The location data generation device 280 can generate location data of the vehicle 10. The location data generation device 280 may include at least one of a global positioning system (GPS) and a differential global positioning system (DGPS). The location data generation device 280 can generate location data of the vehicle 10 based on a signal generated from at least one of the GPS and the DGPS. According to an embodiment, the location data generation device 280 can correct location data based on at least one of the inertial measurement unit (IMU) sensor of the sensing unit 270 and the camera of the object detection device 210. The location data generation device 280 may also be called a global navigation satellite system (GNSS).

The vehicle 10 may include an internal communication system 50. The plurality of electronic devices included in the vehicle 10 may exchange signals through the internal communication system 50. The signals may include data. The internal communication system 50 may use at least one communication protocol (e.g., CAN, LIN, FlexRay, MOST or Ethernet).

(3) Components of Autonomous Device

Figure 3:
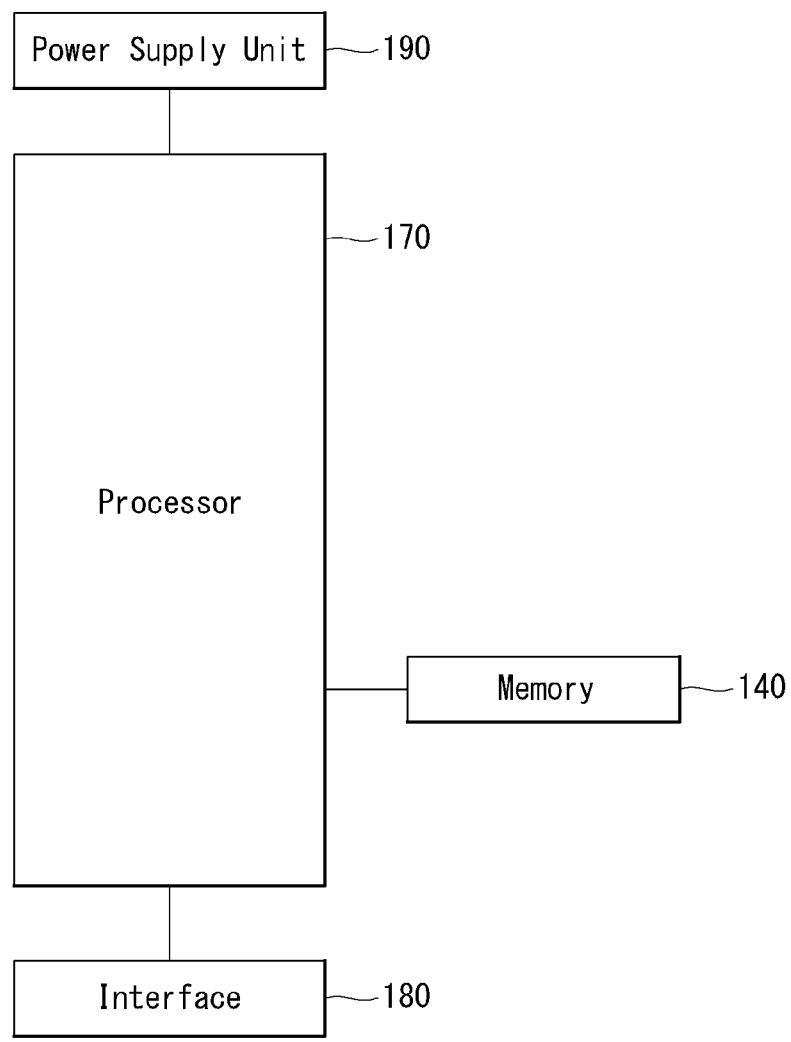
FIG. 3 is a control block diagram of an autonomous device according to an embodiment of the present disclosure.

FIG. 3 is a control block diagram of an autonomous device according to an embodiment of the present disclosure.

Referring to FIG. 3, the autonomous device 260 may include a memory 140, a processor 170, an interface 180, and a power supply unit 190.

The memory 140 is electrically connected to the processor 170. The memory 140 can store basic data for units, control data for operation control of units, and input/output data. The memory 140 can store data processed in the processor 170. Hardware-wise, the memory 140 may be configured as at least one of a ROM, a RAM, an EPROM, a flash drive and a hard drive. The memory 140 may store various types of data for overall operation of the autonomous device 260, such as a program for processing or control of the processor 170. The memory 140 may be integrated with the processor 170. According to an embodiment, the memory 140 may be categorized as a subcomponent of the processor 170.

The interface 180 may exchange signals with at least one electronic device included in the vehicle 10 in a wired or wireless manner. The interface 180 may exchange signals with at least one of the object detection device 210, the communication device 220, the driving operation device 230, the main ECU 240, the driving control device 250, the sensing unit 270 and the location data generation device 280 in a wired or wireless manner. The interface 180 may be configured using at least one of a communication module, a terminal, a pin, a cable, a port, a circuit, an element, and a device.

The power supply unit 190 may supply power to the autonomous device 260. The power supply unit 190 may be supplied with power from a power source (e.g., a battery) included in the vehicle 10 and may supply the power to each unit of the autonomous device 260. The power supply unit 190 may operate in response to a control signal supplied from the main ECU 240. The power supply unit 190 may include a switched-mode power supply (SMPS).

The processor 170 may be electrically connected to the memory 140, the interface 180, and the power supply unit 190 and exchange signals with these components. The processor 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 may operate by power supplied from the power supply unit 190. The processor 170 may receive data, process the data, generate a signal and provide the signal in a state in which power is supplied.

The processor 170 may receive information from other electronic devices included in the vehicle 10 via the interface 180. The processor 170 may provide control signals to other electronic devices in the vehicle 10 via the interface 180.

The autonomous device 260 may include at least one printed circuit board (PCB). The memory 140, the interface 180, the power supply unit 190 and the processor 170 may be electrically connected to the PCB.

(4) Operation of Autonomous Device

Figure 4:
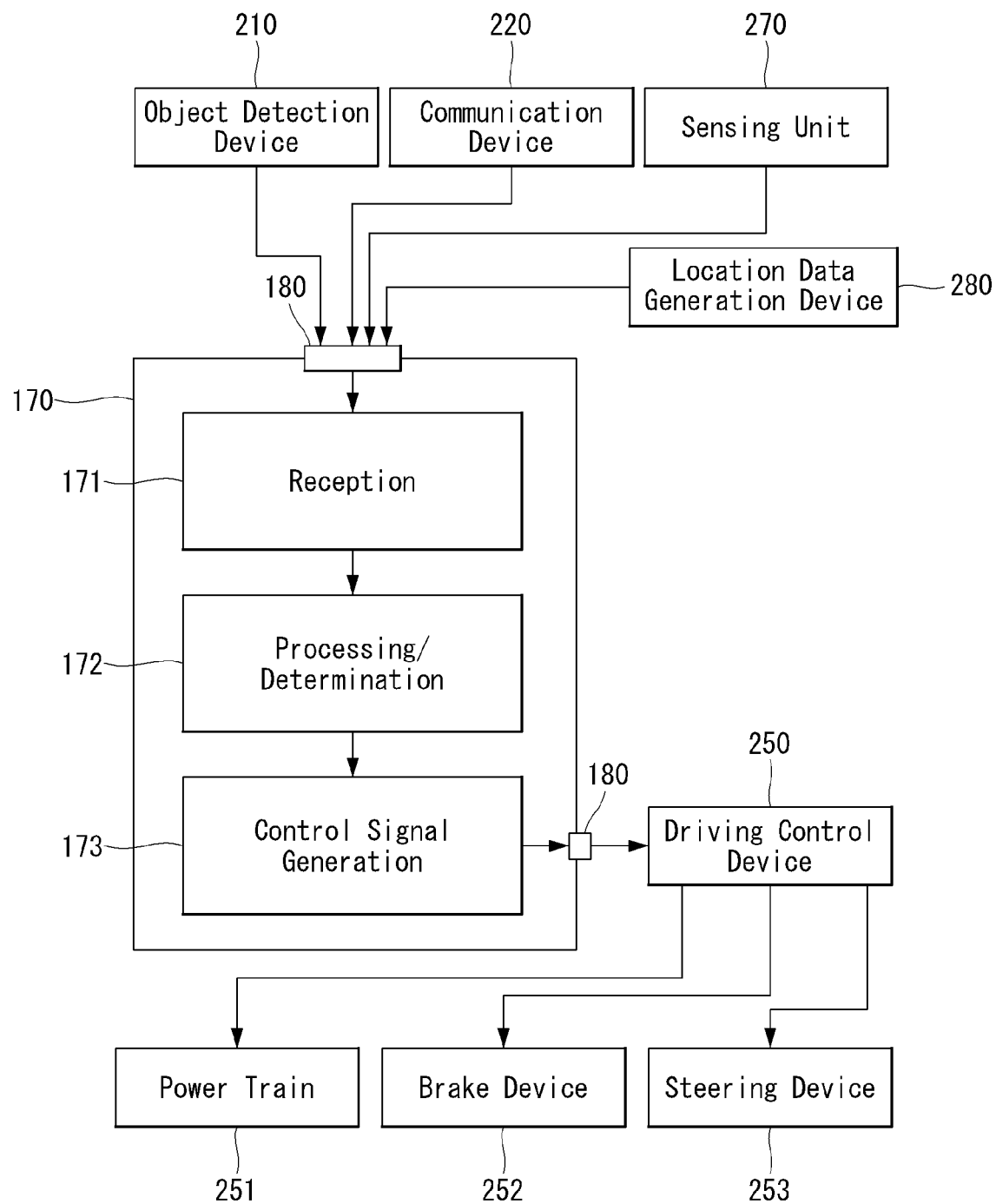
FIG. 4 illustrates a signal flow in an autonomous vehicle according to an embodiment of the present disclosure.

FIG. 4 illustrates a signal flow of an autonomous vehicle according to an embodiment of the present disclosure.

1) Reception Operation

Referring to FIG. 4, the processor 170 may perform a reception operation. The processor 170 may receive data from at least one of the object detection device 210, the communication device 220, the sensing unit 270, and the location data generation device 280 via the interface 180. The processor 170 may receive object data from the object detection device 210. The processor 170 may receive HD map data from the communication device 220. The processor 170 may receive vehicle state data from the sensing unit 270. The processor 170 can receive location data from the location data generation device 280.

2) Processing/Determination Operation

The processor 170 may perform a processing/determination operation. The processor 170 may perform the processing/determination operation based on traveling situation information. The processor 170 may perform the processing/ determination operation based on at least one of object data, HD map data, vehicle state data and location data.

2.1) Driving Plan Data Generation Operation

The processor 170 may generate driving plan data. For example, the processor 170 may generate electronic horizon data. The electronic horizon data can be understood as driving plan data in a range from a position at which the vehicle 10 is located to a horizon. The horizon can be understood as a point a predetermined distance before the position at which the vehicle 10 is located based on a predetermined traveling route. The horizon may refer to a point at which the vehicle can arrive after a predetermined time from the position at which the vehicle 10 is located along a predetermined traveling route.

The electronic horizon data can include horizon map data and horizon path data.

2.1.1) Horizon Map Data

The horizon map data may include at least one of topology data, road data, HD map data and dynamic data. According to an embodiment, the horizon map data may include a plurality of layers. For example, the horizon map data may include a first layer that matches the topology data, a second layer that matches the road data, a third layer that matches the HD map data, and a fourth layer that matches the dynamic data. The horizon map data may further include static object data.

The topology data may be explained as a map created by connecting road centers. The topology data is suitable for approximate display of a location of a vehicle and may have a data form used for navigation for drivers. The topology data may be understood as data about road information other than information on driveways. The topology data may be generated based on data received from an external server through the communication device 220. The topology data may be based on data stored in at least one memory included in the vehicle 10.

The road data may include at least one of road slope data, road curvature data and road speed limit data. The road data may further include no-passing zone data. The road data may be based on data received from an external server through the communication device 220. The road data may be based on data generated in the object detection device 210.

The HD map data may include detailed topology information in units of lanes of roads, connection information of each lane, and feature information for vehicle localization (e.g., traffic signs, lane marking/attribute, road furniture, etc.). The HD map data may be based on data received from an external server through the communication device 220.

The dynamic data may include various types of dynamic information which can be generated on roads. For example, the dynamic data may include construction information, variable speed road information, road condition information, traffic information, moving object information, etc. The dynamic data may be based on data received from an external server through the communication device 220. The dynamic data may be based on data generated in the object detection device 210.

The processor 170 can provide map data in a range from a position at which the vehicle 10 is located to the horizon.

2.1.2) Horizon Path Data

The horizon path data may be explained as a trajectory through which the vehicle 10 can travel in a range from a position at which the vehicle 10 is located to the horizon. The horizon path data may include data indicating a relative probability of selecting a road at a decision point (e.g., a fork, a junction, a crossroad, or the like). The relative probability may be calculated based on a time taken to arrive at a final destination. For example, if a time taken to arrive at a final destination is shorter when a first road is selected at a decision point than that when a second road is selected, a probability of selecting the first road can be calculated to be higher than a probability of selecting the second road.

The horizon path data may include a main path and a sub-path. The main path may be understood as a trajectory obtained by connecting roads having a high relative probability of being selected. The sub-path may be branched from at least one decision point on the main path. The sub-path may be understood as a trajectory obtained by connecting at least one road having a low relative probability of being selected at least one decision point on the main path.

3) Control Signal Generation Operation

The processor 170 can perform a control signal generation operation. The processor 170 can generate a control signal based on the electronic horizon data. For example, the processor 170 may generate at least one of a power train control signal, a brake device control signal and a steering device control signal based on the electronic horizon data.

The processor 170 may transmit the generated control signal to the driving control device 250 via the interface 180. The driving control device 250 may transmit the control signal to at least one of a power train 251, a brake device 252, and a steering device 254.

Cabin

Figure 5:
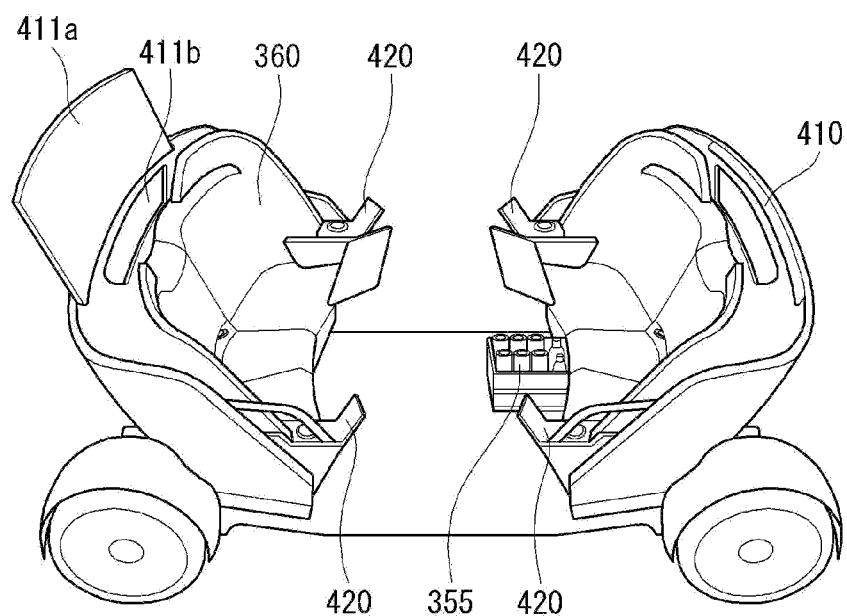
FIG. 5 illustrates interior of a vehicle according to an embodiment of the present disclosure.
Figure 6:
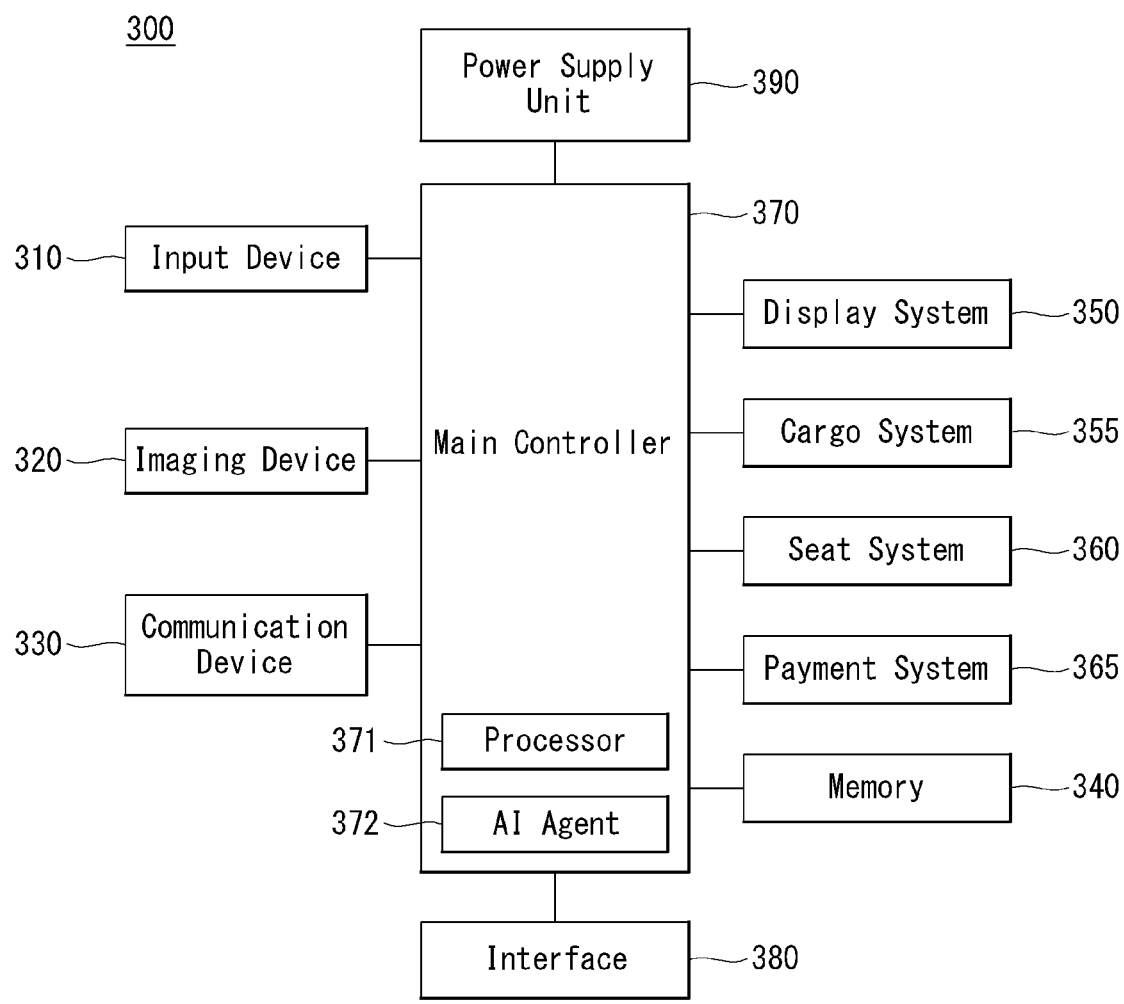
FIG. 6 is a block diagram for explaining a cabin system for vehicle according to an embodiment of the present disclosure.

FIG. 5 illustrates interior of a vehicle according to an embodiment of the present disclosure. FIG. 6 is a block diagram for explaining a cabin system for vehicle according to an embodiment of the present disclosure.

(1) Component of Cabin

Referring to FIGS. 5 and 6, a cabin system 300 for a vehicle (hereinafter, a cabin system) may be defined as a convenience system for a user who uses the vehicle 10. The cabin system 300 may be explained as a high-end system including a display system 350, a cargo system 355, a seat system 360 and a payment system 365. The cabin system 300 may include a main controller 370, a memory 340, an interface 380, a power supply unit 390, an input device 310, an imaging device 320, a communication device 330, the display system 350, the cargo system 355, the seat system 360 and the payment system 365. In another embodiment, the cabin system 300 may further include other components in addition to the components described in the present disclosure, or may not include some of the components described in the present disclosure.

1) Main Controller

The main controller 370 may be electrically connected to the input device 310, the communication device 330, the display system 350, the cargo system 355, the seat system 360 and the payment system 365 and may exchange signals with these components. The main controller 370 can control the input device 310, the communication device 330, the display system 350, the cargo system 355, the seat system 360 and the payment system 365. The main controller 370 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The main controller 370 may consist of at least one sub-controller. In another embodiment, the main controller 370 may include a plurality of sub-controllers. The plurality of sub-controllers may individually control the devices and systems included in the cabin system 300. The devices and systems included in the cabin system 300 may be grouped based on function or grouped based on seats on which a user can sit.

The main controller 370 may include at least one processor 371. FIG. 6 illustrates that the main controller 370 includes one processor 371, by way of example. However, the main controller 371 may include a plurality of processors. The processor 371 may be categorized as one of the above-described sub-controllers.

The processor 371 may receive signals, information or data from a user terminal through the communication device 330. The user terminal may transmit signals, information or data to the cabin system 300.

The processor 371 may identify a user based on image data received from at least one of an internal camera and an external camera included in the imaging device. The processor 371 may identify a user by applying an image processing algorithm to the image data. For example, the processor 371 may identify a user by comparing information received from the user terminal with the image data. For example, the information may include at least one of route information, body information, fellow passenger information, baggage information, location information, preferred content information, preferred food information, disability information and use history information of a user.

The main controller 370 may include an artificial intelligence (AI) agent 372. The AI agent 372 can perform machine learning based on data acquired through the input device 310. The AI agent 371 can control at least one of the display system 350, the cargo system 355, the seat system 360 and the payment system 365 based on machine learning results.

2) Essential Components

The memory 340 is electrically connected to the main controller 370. The memory 340 can store basic data about units, control data for operation control of units, and input/output data. The memory 340 can store data processed in the main controller 370. Hardware-wise, the memory 340 may be configured using at least one of a ROM, a RAM, an EPROM, a flash drive and a hard drive. The memory 340 can store various types of data for the overall operation of the cabin system 300, such as a program for processing or control of the main controller 370. The memory 340 may be integrated with the main controller 370.

The interface 380 can exchange signals with at least one electronic device included in the vehicle 10 in a wired or wireless manner. The interface 380 may be configured using at least one of a communication module, a terminal, a pin, a cable, a port, a circuit, an element and a device.

The power supply unit 390 can provide power to the cabin system 300. The power supply unit 390 can be provided with power from a power source (e.g., a battery) included in the vehicle 10 and supply the power to each unit of the cabin system 300. The power supply unit 390 can operate according to a control signal supplied from the main controller 370. For example, the power supply unit 390 may be implemented as a switched-mode power supply (SMPS).

The cabin system 300 may include at least one printed circuit board (PCB). The main controller 370, the memory 340, the interface 380 and the power supply unit 390 may be mounted on at least one PCB.

3) Input Device

The input device 310 may receive a user input. The input device 310 may convert the user input into an electrical signal. The electrical signal converted by the input device 310 may be converted into a control signal and provided to at least one of the display system 350, the cargo system 355, the seat system 360 and the payment system 365. The main controller 370 or at least one processor included in the cabin system 300 may generate a control signal based on an electrical signal received from the input device 310.

The input device 310 may include at least one of a touch input unit, a gesture input unit, a mechanical input unit and a voice input unit. The touch input unit can convert a user's touch input into an electrical signal. The touch input unit may include at least one touch sensor for detecting a user's touch input. In some embodiments, the touch input unit may implement a touch screen by integrating with at least one display included in the display system 350. Such a touch screen can provide both an input interface and an output interface between the cabin system 300 and a user. The gesture input unit can convert a user's gesture input into an electrical signal. The gesture input unit may include at least one of an infrared sensor and an image sensor for detecting a user's gesture input. In some embodiments, the gesture input unit can detect a user's three-dimensional gesture input. To this end, the gesture input unit may include a plurality of light output units for outputting infrared light or a plurality of image sensors. The gesture input unit may detect a user's three-dimensional gesture input using TOF (Time of Flight), structured light or disparity. The mechanical input unit can convert a user's physical input (e.g., press or rotation) through a mechanical device into an electrical signal. The mechanical input unit may include at least one of a button, a dome switch, a jog wheel and a jog switch. Meanwhile, the gesture input unit and the mechanical input unit may be integrated. For example, the input device 310 may include a jog dial device that includes a gesture sensor and is formed such that it can be inserted/ejected into/from a part of a surrounding structure (e.g., at least one of a seat, an armrest and a door). When the jog dial device is parallel to the surrounding structure, the jog dial device can serve as a gesture input unit. When the jog dial device is protruded from the surrounding structure, the jog dial device can serve as a mechanical input unit. The voice input unit can convert a user's voice input into an electrical signal. The voice input unit may include at least one microphone. The voice input unit may include a beam forming MIC.

4) Imaging Device

The imaging device 320 may include at least one camera. The imaging device 320 may include at least one of an internal camera and an external camera. The internal camera may take an image of the inside of the cabin. The external camera may take an image of the outside of the vehicle. The internal camera can acquire an image of the inside of the cabin. The imaging device 320 may include at least one internal camera. It is desirable that the imaging device 320 include as many cameras as the number of passengers who can ride in the vehicle. The imaging device 320 can provide an image acquired by the internal camera. The main controller 370 or at least one processor included in the cabin system 300 can detect a motion of a user based on an image acquired by the internal camera, generate a signal based on the detected motion, and provide the signal to at least one of the display system 350, the cargo system 355, the seat system 360 and the payment system 365. The external camera can acquire an image of the outside of the vehicle. The imaging device 320 may include at least one external camera. It is desirable that the imaging device 320 include as many cameras as the number of doors through which passengers ride in the vehicle. The imaging device 320 can provide an image acquired by the external camera. The main controller 370 or at least one processor included in the cabin system 300 can acquire user information based on the image acquired by the external camera. The main controller 370 or at least one processor included in the cabin system 300 can authenticate a user or acquire body information (e.g., height information, weight information, etc.), fellow passenger information and baggage information of a user based on the user information.

5) Communication Device

The communication device 330 can exchange signals with external devices in a wireless manner. The communication device 330 can exchange signals with external devices via a network or directly exchange signals with external devices. The external devices may include at least one of a server, a mobile terminal and another vehicle. The communication device 330 may exchange signals with at least one user terminal. The communication device 330 may include an antenna and at least one of an RF circuit and an RF element which can implement at least one communication protocol in order to perform communication. In some embodiments, the communication device 330 may use a plurality of communication protocols. The communication device 330 may switch communication protocols according to a distance to a mobile terminal.

For example, the communication device can exchange signals with the external devices based on C-V2X (Cellular V2X). For example, the C-V2X may include sidelink communication based on LTE and/or sidelink communication based on NR.

For example, the communication device can exchange signals with external devices based on dedicated short range communications (DSRC) or Wireless Access in Vehicular Environment (WAVE) standards based on IEEE 802.11p PHY/MAC layer technology and IEEE 1609 Network/Transport layer technology. The DSRC (or WAVE standards) is communication specifications for providing an intelligent transport system (ITS) service via short-range dedicated communication between vehicle-mounted devices or between a roadside device and a vehicle-mounted device. The DSRC may be a communication scheme that can use a frequency of 5.9 GHz and have a data transfer rate in the range of 3 Mbps to 27 Mbps. IEEE 802.11p may be combined with IEEE 1609 to support DSRC (or WAVE standards).

The communication device according to the present disclosure may exchange signals with the external devices using only one of C-V2X and DSRC. Alternatively, the communication device according to the present disclosure may exchange signals with the external devices using a hybrid of C-V2X and DSRC.

6) Display System

The display system 350 can display graphic objects. The display system 350 may include at least one display device. For example, the display system 350 may include a first display device 410 for common use and a second display device 420 for individual use.

6.1) Common Display Device

The first display device 410 may include at least one display 411 which outputs visual content. The display 411 included in the first display device 410 may be implemented by at least one of a flat panel display, a curved display, a rollable display and a flexible display. For example, the first display device 410 may include a first display 411 which is positioned behind a seat and formed to be inserted/ejected into/from the cabin, and a first mechanism for moving the first display 411. The first display 411 may be disposed such that it can be inserted/ejected into/from a slot formed in a seat main frame. In some embodiments, the first display device 410 may further include a flexible area control mechanism. The first display may be formed to be flexible and a flexible area of the first display may be controlled according to user position. For example, the first display device 410 may be disposed on the ceiling inside the cabin and include a second display formed to be rollable and a second mechanism for rolling or unrolling the second display. The second display may be formed such that images can be displayed on both sides thereof. For example, the first display device 410 may be disposed on the ceiling inside the cabin and include a third display formed to be flexible and a third mechanism for bending or unbending the third display. In some embodiments, the display system 350 may further include at least one processor which provides a control signal to at least one of the first display device 410 and the second display device 420. The processor included in the display system 350 can generate a control signal based on a signal received from at last one of the main controller 370, the input device 310, the imaging device 320 and the communication device 330.

A display area of a display included in the first display device 410 may be divided into a first area 411a and a second area 411b. The first area 411a can be defined as a content display area. For example, the first area 411 may display at least one of graphic objects corresponding to can display entertainment content (e.g., movies, sports, shopping, food, etc.), video conferences, food menu and augmented reality screens. The first area 411a may display graphic objects corresponding to traveling situation information of the vehicle 10. The traveling situation information may include at least one of object information outside the vehicle, navigation information and vehicle state information. The object information outside the vehicle may include information on presence or absence of an object, positional information of an object, information on a distance between the vehicle and an object, and information on a relative speed of the vehicle with respect to an object. The navigation information may include at least one of map information, information on a set destination, route information according to setting of the destination, information on various objects on a route, lane information and information on the current position of the vehicle. The vehicle state information may include vehicle attitude information, vehicle speed information, vehicle tilt information, vehicle weight information, vehicle orientation information, vehicle battery information, vehicle fuel information, vehicle tire pressure information, vehicle steering information, vehicle indoor temperature information, vehicle indoor humidity information, pedal location information, vehicle engine temperature information, etc. The second area 411b may be defined as a user interface area. For example, the second area 411b may display an AI agent screen. The second area 411b may be located in an area defined by a seat frame according to an embodiment. In this case, a user can view content displayed in the second area 411b between seats. The first display device 410 may provide hologram content according to an embodiment. For example, the first display device 410 may provide hologram content for each of a plurality of users such that only a user who requests the content can view the content.

6.2) Display Device for Individual Use

The second display device 420 may include at least one display 421. The second display device 420 can provide the display 421 at a position at which only an individual passenger can view display content. For example, the display 421 may be disposed on an armrest of a seat. The second display device 420 can display graphic objects corresponding to personal information of a user. The second display device 420 may include as many displays 421 as the number of passengers who can ride in the vehicle. The second display device 420 can realize a touch screen by forming a layered structure along with a touch sensor or being integrated with the touch sensor. The second display device 420 can display graphic objects for receiving a user input for seat adjustment or indoor temperature adjustment.

7) Cargo System

The cargo system 355 can provide items to a user at the request of the user. The cargo system 355 can operate based on an electrical signal generated by the input device 310 or the communication device 330. The cargo system 355 can include a cargo box. The cargo box can be hidden in a part under a seat. When an electrical signal based on user input is received, the cargo box can be exposed to the cabin. The user can select a necessary item from articles loaded in the cargo box. The cargo system 355 may include a sliding moving mechanism and an item pop-up mechanism in order to expose the cargo box according to user input. The cargo system 355 may include a plurality of cargo boxes in order to provide various types of items. A weight sensor for determining whether each item is provided may be embedded in the cargo box.

8) Seat System

The seat system 360 can provide a user customized seat to a user. The seat system 360 can operate based on an electrical signal generated by the input device 310 or the communication device 330. The seat system 360 can adjust at least one element of a seat based on acquired user body data. The seat system 360 may include a user detection sensor (e.g., a pressure sensor) for determining whether a user sits on a seat. The seat system 360 may include a plurality of seats on which a plurality of users can sit. One of the plurality of seats can be disposed to face at least other seat. At least two users can set facing each other inside the cabin.

9) Payment System

The payment system 365 can provide a payment service to a user. The payment system 365 can operate based on an electrical signal generated by the input device 310 or the communication device 330. The payment system 365 can calculate a price for at least one service used by the user and request the user to pay the calculated price.

(2) Autonomous Vehicle Usage Scenario

Figure 7:
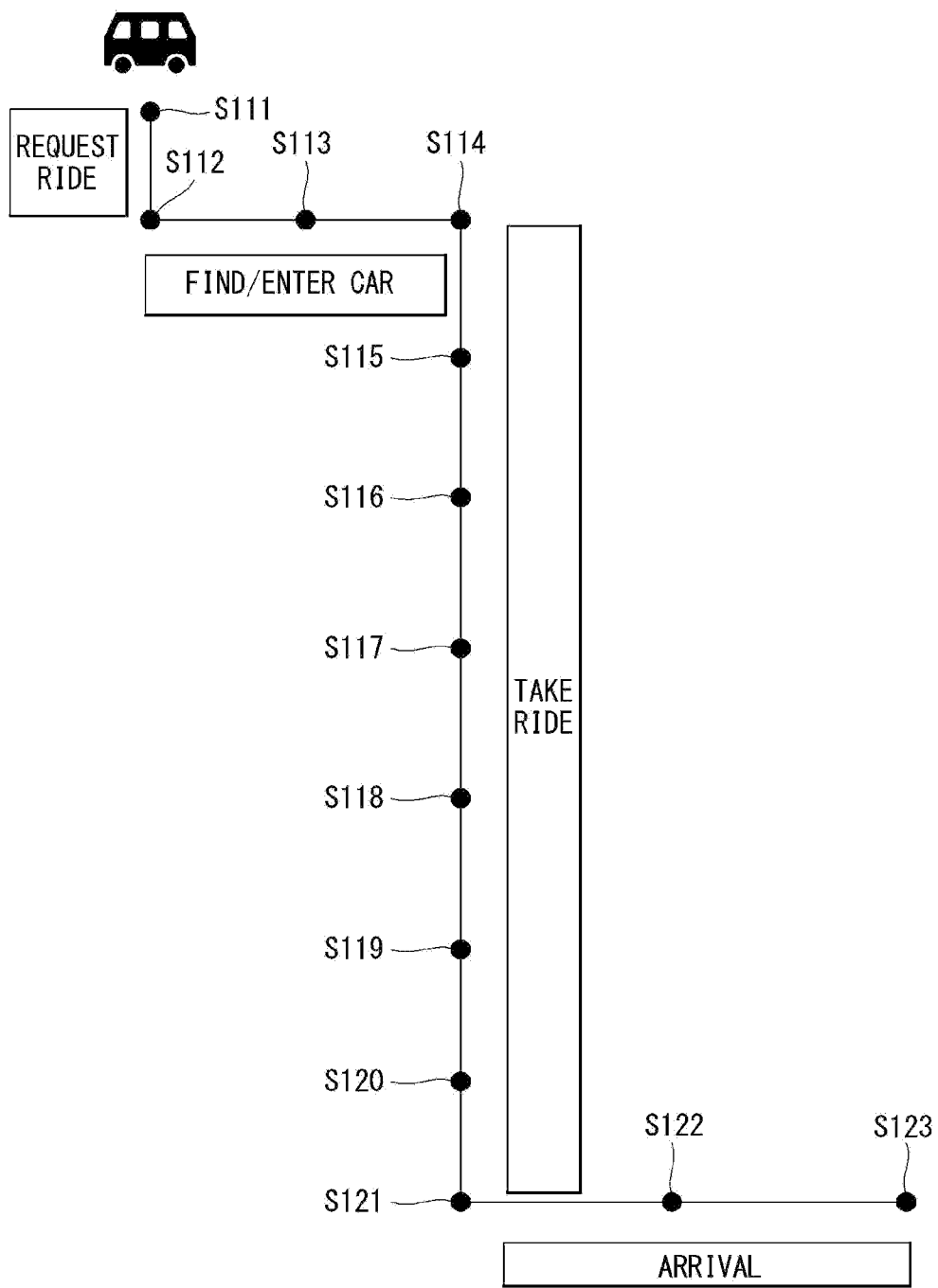
FIG. 7 is a diagram for explaining a usage scenario of a user in accordance with an embodiment of the present disclosure.

FIG. 7 is a diagram for explaining a usage scenario of a user in accordance with an embodiment of the present disclosure.

1) Destination Prediction Scenario

A first scenario S111 is a scenario for prediction of a destination of a user. An application which can operate in connection with the cabin system 300 can be installed in a user terminal. The user terminal can predict a destination of a user based on user's contextual information through the application. The user terminal can provide information on unoccupied seats in the cabin through the application.

2) Cabin Interior Layout Preparation Scenario

A second scenario S112 is a cabin interior layout preparation scenario. The cabin system 300 may further include a scanning device for acquiring data about a user located outside the vehicle. The scanning device can scan a user to acquire body data and baggage data of the user. The body data and baggage data of the user can be used to set a layout. The body data of the user can be used for user authentication. The scanning device may include at least one image sensor. The image sensor can acquire a user image using light of the visible band or infrared band.

The seat system 360 can configure a cabin interior layout based on at least one of the body data and baggage data of the user. For example, the seat system 360 may provide a baggage compartment or a car seat installation space.

3) User Welcome Scenario

A third scenario S113 is a user welcome scenario. The cabin system 300 may further include at least one guide light. The guide light can be disposed on the floor of the cabin. When a user riding in the vehicle is detected, the cabin system 300 can turn on the guide light such that the user sits on a predetermined seat among a plurality of seats. For example, the main controller 370 may implement a moving light by sequentially turning on a plurality of light sources over time from an open door to a predetermined user seat.

4) Seat Adjustment Service Scenario

A fourth scenario S114 is a seat adjustment service scenario. The seat system 360 can adjust at least one element of a seat that matches a user based on acquired body information.

5) Personal Content Provision Scenario

A fifth scenario S115 is a personal content provision scenario. The display system 350 can receive user personal data through the input device 310 or the communication device 330. The display system 350 can provide content corresponding to the user personal data.

6) Item Provision Scenario

A sixth scenario S116 is an item provision scenario. The cargo system 355 can receive user data through the input device 310 or the communication device 330. The user data may include user preference data, user destination data, etc. The cargo system 355 can provide items based on the user data.

7) Payment Scenario

A seventh scenario S117 is a payment scenario. The payment system 365 can receive data for price calculation from at least one of the input device 310, the communication device 330 and the cargo system 355. The payment system 365 can calculate a price for use of the vehicle by the user based on the received data. The payment system 365 can request payment of the calculated price from the user (e.g., a mobile terminal of the user).

8) Display System Control Scenario of User

An eighth scenario S118 is a display system control scenario of a user. The input device 310 can receive a user input having at least one form and convert the user input into an electrical signal. The display system 350 can control displayed based on the electrical signal.

9) AI Agent Scenario

A ninth scenario S119 is a multi-channel artificial intelligence (AI) agent scenario for a plurality of users. The AI agent 372 can distinguish an user input per each of a plurality of users. The AI agent 372 can control at least one of the display system 350, the cargo system 355, the seat system 360, and the payment system 365 in response to electrical signals obtained by converting an individual user input from the plurality of users.

10) Multimedia Content Provision Scenario for Multiple Users

A tenth scenario S120 is a multimedia content provision scenario for a plurality of users. The display system 350 can provide content that can be viewed by all users together. In this case, the display system 350 can individually provide the same sound to the plurality of users through speakers provided for respective seats. The display system 350 can provide content that can be individually viewed by the plurality of users. In this case, the display system 350 can provide individual sound through a speaker provided for each seat.

11) User Safety Secure Scenario

An eleventh scenario S121 is a user safety secure scenario. When information on an object around the vehicle which threatens a user is acquired, the main controller 370 can control an alarm with respect to the object around the vehicle to be output through the display system 350.

12) Personal Belongings Loss Prevention Scenario

A twelfth scenario S122 is a user's belongings loss prevention scenario. The main controller 370 can acquire data about user's belongings through the input device 310. The main controller 370 can acquire user motion data through the input device 310. The main controller 370 can determine whether the user exits the vehicle leaving the belongings in the vehicle based on the data about the belongings and the motion data. The main controller 370 can control an alarm with respect to the belongings to be output through the display system 350.

13) Alighting Report Scenario

A thirteenth scenario S123 is an alighting report scenario. The main controller 370 can receive alighting data of a user through the input device 310. After the user exits the vehicle, the main controller 370 can provide report data according to alighting to a mobile terminal of the user through the communication device 330. The report data may include data about a total charge for using the vehicle 10.

Vehicle Image Processing Device and Vehicle Including the Same

Based on the contents described above, a vehicle image processing device and a vehicle including the same according to a first embodiment of the present disclosure are described in detail below.

The vehicle image processing device according to the first embodiment of the present disclosure may be a device for generating an AR screen from a plurality of cameras. The vehicle image processing device according to the first embodiment of the present disclosure may be a device for implementing a target on an AR screen.

In the following description, vehicles used for the present disclosure may include an internal-combustion engine vehicle having an engine as a power source, a hybrid vehicle having an engine and an electric motor as a power source, an electric vehicle having an electric motor as a power source, and the like.

In the present disclosure, a direction is described based on a direction of travel for the vehicle to advance. That is, the direction of travel for the vehicle to advance is assumed as a front side, and a rear side and a lateral side may be defined based on the front side. However, they are merely examples, and the present disclosure is not limited thereto.

Figure 9A:
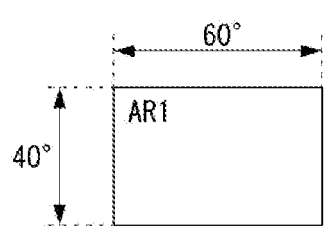
FIGS. 9A and B illustrate a view angle for each camera according to an embodiment of the present disclosure.
Figure 9B:
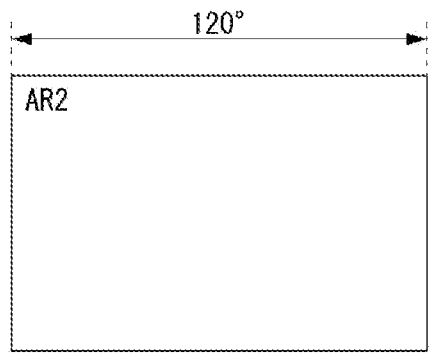

FIG. 8 illustrates a vehicle image processing device and a vehicle including the same according to an embodiment of the present disclosure. FIGS. 9A and 9B illustrate a view angle for each camera according to an embodiment of the present disclosure.

According to FIG. 8, a vehicle 10 according to an embodiment of the present disclosure may include an input device 400, a plurality of cameras 500, a vehicle image processing device 600, and a display 700. The input device 400 may include an internal camera 410 and/or an internal microphone 420 of the vehicle 10. The plurality of cameras 500 may include a first camera 510, a second camera 520 and/or a third camera 530. The vehicle image processing device 600 may include a memory 610 and a processor 620.

The input device 400 may be the input device 310 of FIG. 6 in the cabin 100. In addition, the display 700 may be included in the display system 350 of FIG. 6 in the cabin 100. Further, the processor 620 may be the processor 170 of FIG. 3 or the processor 371 of FIG. 6 in the cabin 100.

According to FIG. 8, the vehicle according to the present disclosure may include the first camera 510, the second camera 520, and the vehicle image processing device 600. The vehicle according to the present disclosure may further include the third camera 530, and the number of cameras may be added, if necessary or desired. The third camera 530 may be a camera for improving visibility of the AR screen displayed on the display 700 according to the present disclosure.

According to FIG. 8, the vehicle image processing device 600 according to the present disclosure may include the memory 610 and the processor 620.

The memory 610 stores data supporting various functions of the vehicle image processing device 600. The memory 610 may store multiple application programs (or applications) executed in the vehicle image processing device 600, and data and commands for various executions. At least some of the application programs may be downloaded from an external server through wireless communication. The application programs may be stored in the memory 610, installed on the vehicle image processing device 600, and driven to perform the operation (function) of the vehicle image processing device 600 by the processor 620.

The memory 610 may include at least one storage medium of a flash memory type, a hard disk type, a solid state disk (SSD) type, a silicon disk drive (SDD) type, a multimedia card micro type, a card type memory (e.g., SD or XD memory, etc.), a random access memory (RAM), a static random access memory (SRAM), read-only memory (ROM), an electrically erasable programmable read-only memory (EEPROM), a programmable read-only memory (PROM), a magnetic memory, a magnetic disk, and an optical disk. In addition, the memory 610 may include a web storage performing a storage function of the memory 610 on Internet.

The memory 610 according to the present disclosure may store a first image for a first area AR1 taken with the camera and store a second image for a second area AR2 taken with the second camera 520. The second area AR2 may include at least a portion of the first area AR1. That is, the second area AR2 and the first area AR1 may at least partially overlap each other. Thus, the second image of the second area AR2 may at least partially overlap the first image of the first area AR1.

In addition, the second area AR2 may fully include the first area AR1. That is, the second area AR2 may overlap the first area AR1. Thus, the taken second image for the second area AR2 may include the taken first image for the first area AR1.

The processor 620 is a component capable of performing arithmetic operations and controlling other devices. The processor 620 may mainly indicate a central processing unit (CPU), an application processor (AP), a graphics processing unit (GPU), and the like. Further, the CPU, AP, or GPU may include one or more cores therein, and may operate using an operating voltage and a clock signal. However, while the CPU or the AP consists of several cores optimized for serial processing, the GPU may consist of thousands of smaller and more efficient cores designed for parallel processing.

The processor 620 according to the present disclosure may generate a non-overlapping area 910 in which the first image and the second image do not overlap, and generate visual information considering the non-overlapping area 910.

The processor 620 according to the present disclosure may obtain target information by sensing a target TG included in the first image based on input information obtained from passengers. For example, the input information may include voice information of the passengers in the vehicle or gaze information of the passengers. For example, the input information may include voice information of the passengers, gaze information of the passengers, or behavior information of the passengers.

Accordingly, the vehicle according to the present disclosure may further include an internal camera (not shown) or an internal microphone (not shown). The internal camera of the vehicle may take image (or video) of passengers, and the vehicle image processing device 600 or the processor 620 may obtain gaze information or behavior information of the passengers based on the image (or video) of the passengers. The internal microphone of the vehicle may sense voice of the passengers, and the vehicle image processing device 600 or the processor 620 may obtain voice information of the passengers based on a sensed voice file.

For example, information that the passenger asks what the target TG is by voice, or information that the target TG to which the passenger's gaze is directed exists, or information that what target TG the passenger points with a finger is may be input to the vehicle. As above, based on the information input to the vehicle, the vehicle image processing device 600 or the vehicle including the same can accurately specify the target TG for which the passenger wants to obtain information.

Specifically, when input information is voice information of the passenger (e.g., when the passenger says "What is that?"), gaze information of the passenger may be obtained based on the passenger's voice information. That is, the vehicle image processing device 600, the vehicle including the same, or the processor 620 may obtain gaze information from the passenger based on the voice information.

The processor 620 according to the present disclosure may track a moving line of the target TG and generate an image corresponding to the target TG. When the target TG moves to the non-overlapping area 910, the processor 620 according to the present disclosure may acquire predicted coordinate information of the target TG. In this instance, the predicted coordinate information may be acquired by extending the moving line to the non-overlapping area 910.

According to FIGS. 8 and 9, the vehicle according to the present disclosure may include the plurality of cameras 500. The first camera 510 may be an advanced driver assistance systems (ADAS) camera. A first view angle of the first camera 510 may be between about 40° and about 80°, preferably, about 60°. The first view angle may indicate a view angle in a transverse direction based on the camera. A second view angle of the first camera 510 may be between about 30° and about 50°, preferably, about 40°. The second view angle may indicate a view angle in a longitudinal direction based on the camera.

According to FIGS. 9A and 9B, the second camera 520 may be an RGB camera for forming an AR screen. The second camera 520 may be a camera for taking a background image of AR. A first view angle of the second camera 520 may be between about 100° and about 140°, preferably, about 120°. A second view angle of the second camera 520 may be between about 45° and about 75°, preferably, about 60°. The first view angle and the second view angle of the second camera 520 may be measured in the same basis as the first camera 510.

That is, the first view angle of the second camera 520 may be wider than the first view angle of the first camera 510. Alternatively, the second view angle of the second camera 520 may be wider than the second view angle of the first camera 510.

According to FIG. 8, the third camera 530 may indicate all cameras except the first camera 510 and the second camera 520. The third camera 530 may be at least one camera selected from a group including an ADAS camera, an RGB camera, a cloud camera, an infrared camera, a night camera, a thermal imaging (FIR) camera, a wide angle camera, and the like. The images (or videos, hereinafter the video and the image may be mixed and used) obtained by the first camera 510 and the second camera 520 and the image (or video) obtained by the third camera 530 may be combined.

The cloud camera is a camera used by a map service provider to obtain map information, and an image including the obtained map information may be uploaded to a cloud (or server). The cloud (or server) may acquire visual information from the image through image recognition. Thus, the vehicle image processing device 600 or the processor 620 according to the present disclosure may receive the uploaded image from the cloud (or server) or obtain the visual information.

Accordingly, when the processor 620 fails to sense the target TG included in the first image based on the input information acquired from the passenger, the processor 620 according to the present disclosure may sense the target TG based on a third image obtained from the third camera 530.

Generating visual information using the third camera 530 is described in detail below.

FIGS. 10A through 11C illustrate an image (or video) generated by combining images (or videos) taken by a first camera and a second camera in accordance with the present disclosure.

Figures 10A, 10B:
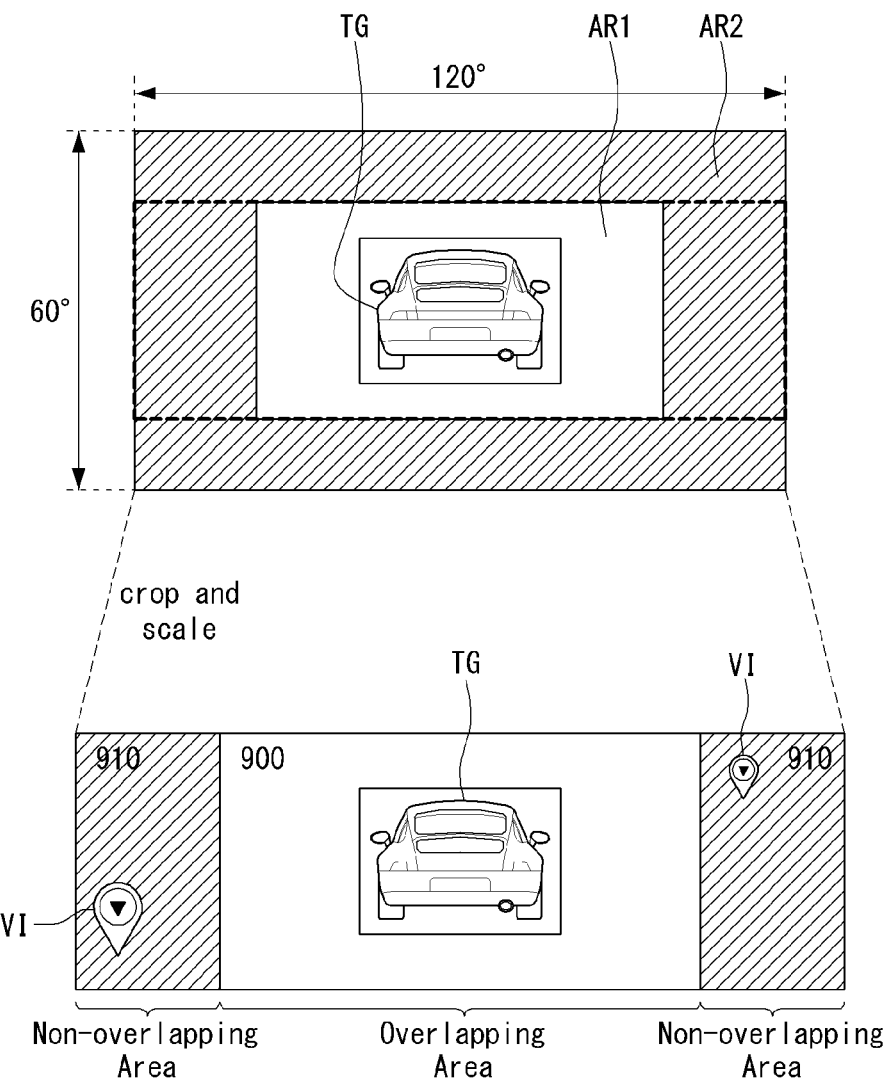
FIGS. 10A and 10B, and FIGS. 11A, 11B and 11C illustrate an image (or video) generated by combining images (or videos) taken by a first camera and a second camera in accordance with the present disclosure.

According to FIGS. 10A and B, the vehicle image processing device 600 according to the present disclosure may generate one image by combining images obtained from the first camera 510 and the second camera 520.

According to FIG. 10A, due to a difference in a view angle between the first camera 510 and the second camera 520, the non-overlapping area 910 was generated at the up, down, left and right sides. The non-overlapping area 910 may refer to an area, in which an image taken by the first camera 510 and an image taken by the second camera 520 do not overlap each other, due to the view angle difference.

In FIGS. 10A and 10B, the hatched area may denote the non-overlapping area 910.

According to FIG. 10B, the image combined by the vehicle image processing device 600 may be cropped to the appropriate size. The combined image may be scaled to the appropriate size. For example, in the combined image, the non-overlapping areas 910 generated at the left and right sides are not cropped as it is, and the non-overlapping areas 910 generated at the up and down sides may be cropped. An area excluding the non-overlapping area 910 from the combined image may be an overlapping area 900.

According to FIG. 10B, the target TG positioned in the overlapping area 900 may be sensed by the first camera 510. The vehicle image processing device 600 may obtain information about a form, kind, type, etc. of the sensed target TG. The vehicle image processing device 600 may generate visual information VI suitable for the target TG based on the obtained information and may display the generated visual information VI on the combined image. The visual information VI may include an image corresponding to the target TG. That is, the visual information VI may indicate the target TG.

According to FIG. 10B, neighboring buildings positioned in the non-overlapping area 910 may be denoted by POI. That is, the visual information VI may include an image corresponding to the target TG, and may also POI for the neighboring buildings positioned in the non-overlapping area 910.

Figure 11A:
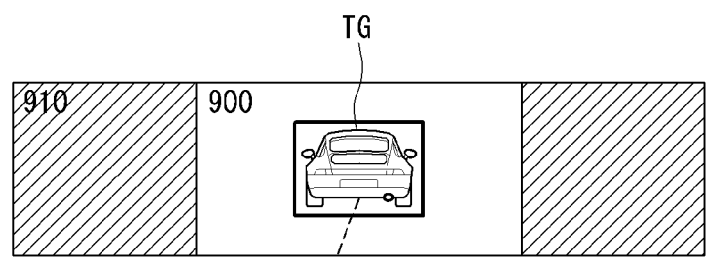
Figure 11B:
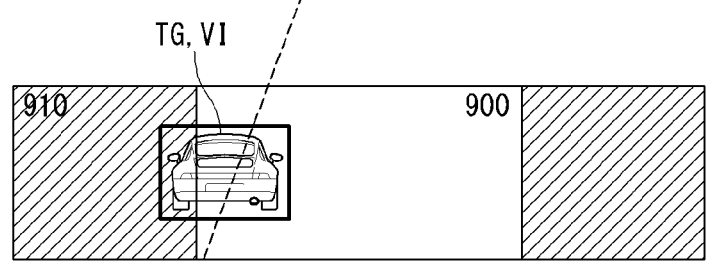
Figure 11C:
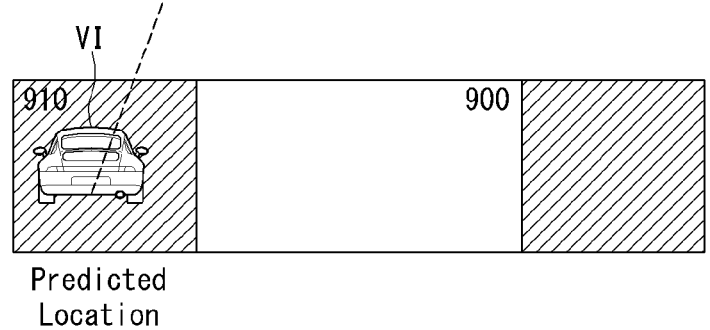

According to FIGS. 11A to 11C, as the vehicle drives, the target TG positioned in the overlapping area 900 may seem to gradually move to the non-overlapping area 910. The target TG is sensed by the first camera 510, but the first camera 510 cannot sense the target TG when the target TG is positioned in the non-overlapping area 910. In this instance, predicted location information of the target TG in the non-overlapping area 910 may be obtained based on information on the target TG measured by the first camera 510.

The predicted location information of the target TG may be predicted based on coordinate information about a first location of the target TG and coordinate information about a second location of the target TG. An example of the prediction method may extend a straight line (or moving line) connecting coordinates of the first location and coordinates of the second location to the non-overlapping area 910, and obtain predicted location information of the target TG from the extended straight line (or moving line) in consideration of the speed of the target TG. Thus, the processor 620 according to the present disclosure may represent the target TG by the visual information VI based on the predicted location information of the target TG in the non-overlapping area 910.

Figure 12:
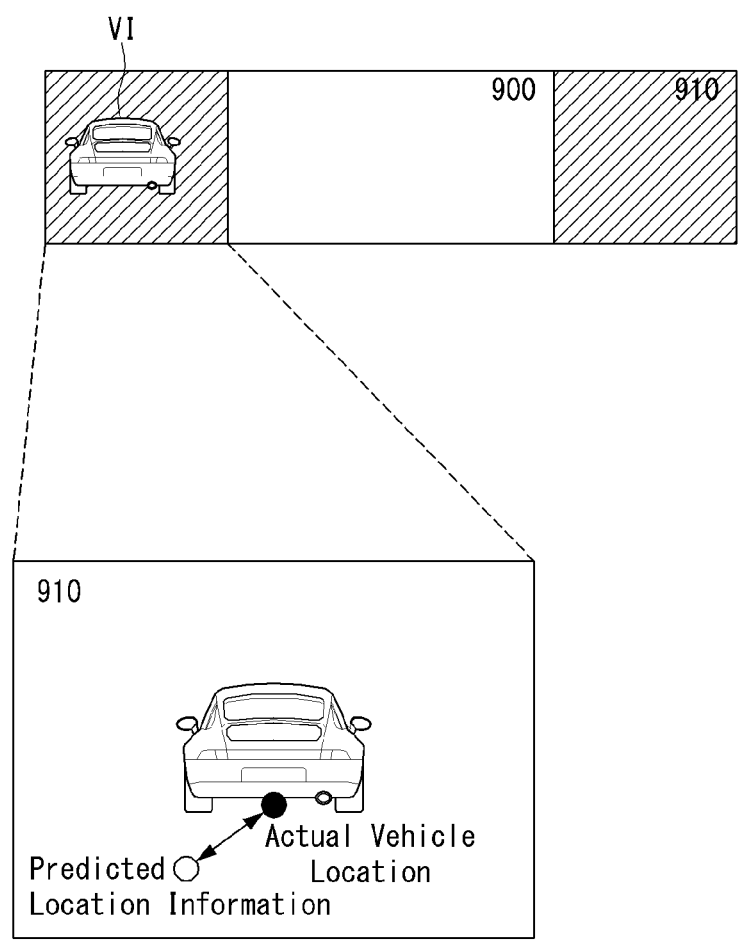
FIGS. 12 and 13 illustrate correction of predicted location information of a target according to the present disclosure.
Figure 13:
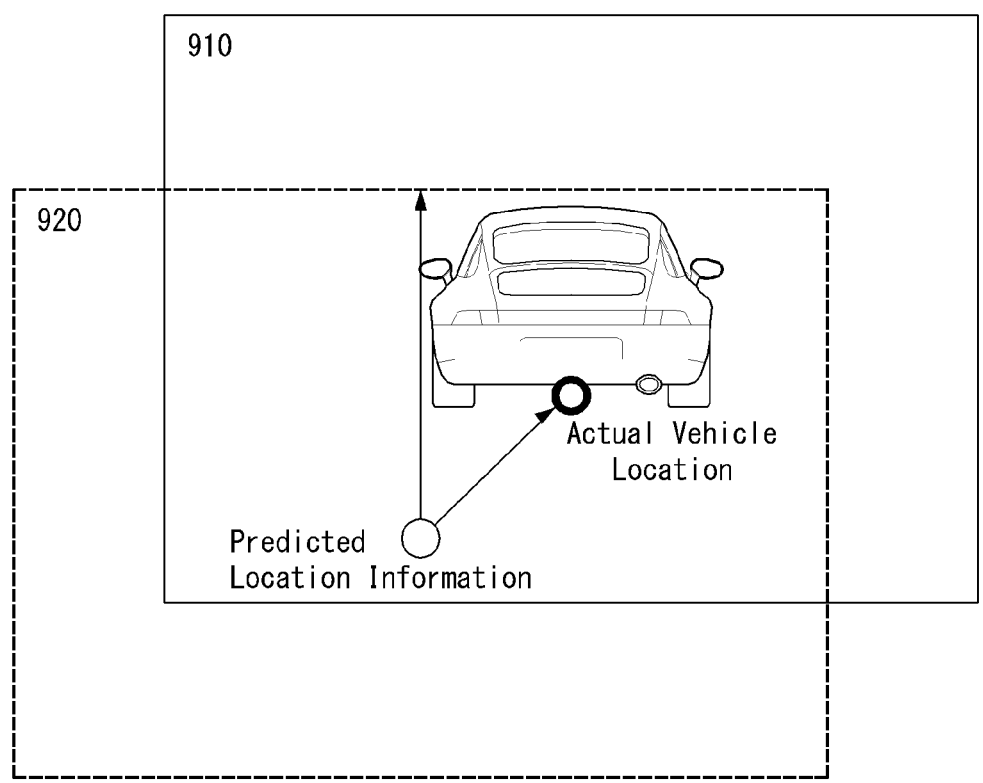

FIGS. 12 and 13 illustrate correction of predicted location information of a target according to the present disclosure.

According to FIG. 12, predicted location information of the target TG in the non-overlapping area 910 is generated based on coordinate information calculated by the processor 620, and thus may be different from an actual location of the target TG. Such an error may cause serious safety problems while driving.

According to FIG. 13, in order solve the problems, the present disclosure may set a window 920 cropping a portion of an image of the second camera 520, and more accurately sense the location of the target TG in the set window 920 using an image recognition algorithm.

The memory 610 according to the present disclosure may store a second image including the target TG from the second camera 520. The processor 620 according to the present disclosure may correct the predicted coordinate information based on the second image including the target TG.

That is, the processor 620 according to the present disclosure may obtain the area of the predetermined window 920 for the second image and may correct the predicted coordinate information based on the area of the predetermined window 920.

As above, the processor 620 may assign a partial area of the non-overlapping area 910 as the window 920 not performing the target sensing using the image recognition on the entire image of the second camera 520. When the image recognition algorithm is applied to the target TG only within the range of the corresponding window 920, the accurate coordinate information of the target TG can be obtained using much less resources than when the image recognition algorithm is applied to the entire image of the second camera 520.

The window 920 may be generated by the processor 620 and may be generated based on the predicted location information of the target TG. That is, the window 920 may be generated around a predicted location of the target TG. That is, the window 920 of a smaller range can be generated by utilizing the predicted location information of the target TG, and accurate location information of the target TG can be obtained using the less resources. In addition, since feature information of the target TG is obtained in advance by the first camera 510, there is no need to sense the feature information of the target TG.

In this instance, the image recognition algorithm used may be a deep learning-based image recognition algorithm.

FIGS. 14A to 16C illustrate examples of visual information according to the present disclosure.

Figure 14A:
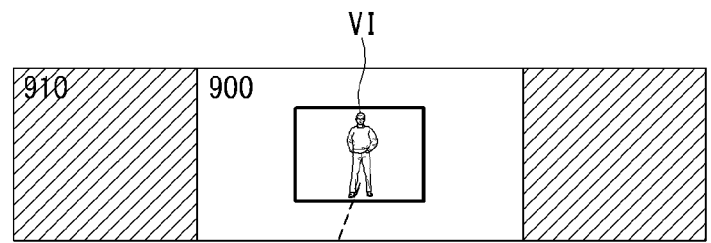
FIGS. 14A, 14B and 14C illustrate examples of visual information according to an embodiment of the present disclosure.

In the non-overlapping area 910, the visual information VI may be expressed differently according to the type of the target TG. In the non-overlapping area 910, the visual information VI may be expressed differently according to the importance based on the type of the target TG. In addition, in the non-overlapping area 910, the visual information VI may be expressed differently depending on whether the target TG is a moving target or a static target. FIGS. 14A and 15C correspond to the case where the target TG is the moving target, and FIG. 16A through 16C corresponds to the case where the target TG is the static target. The moving target may include pedestrians, vehicles, etc. and the static target may include signs, buildings, etc.

Figure 14B:
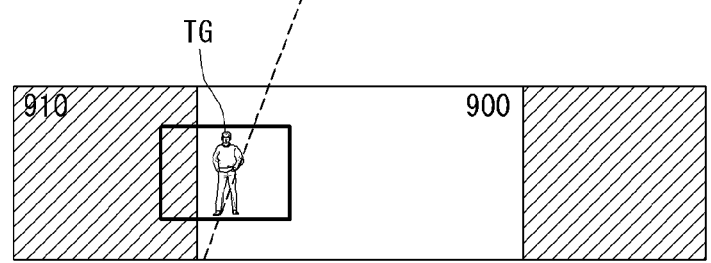
Figure 14C:
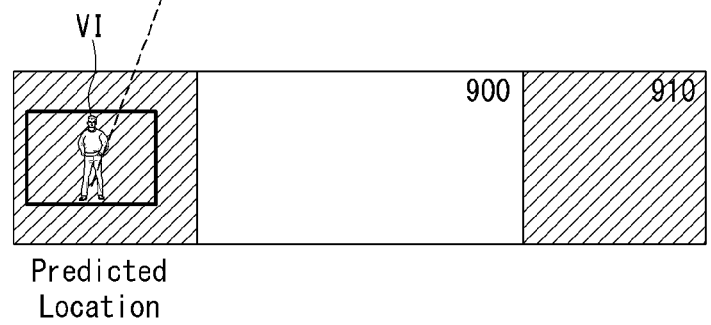

According to FIGS. 14A to 14C, the first camera 510 may sense a pedestrian as the target TG. When the target TG is a pedestrian, the visual information VI may include an image representing a person since the driver must drive more carefully. The type of the target TG may be classified into a pedestrian, a vehicle, and a sign, and the type of the target TG may be sensed by the first camera 510.

According to FIGS. 14A to 14C, even when the target TG moves to the non-overlapping area 910, the visual information VI including an image capable of displaying the type of the target TG as it is may be displayed.

Further, the size of the visual information VI may be changed depending on the location of the target TG. As the location of the target TG becomes closer to the vehicle, the visual information VI may be expressed in the larger size.

Figure 15A:
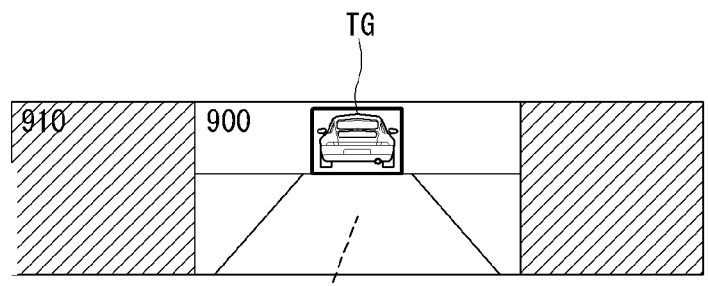
FIGS. 15A, 15B and 15C illustrate examples of visual information according to an embodiment of the present disclosure.
Figure 15B:
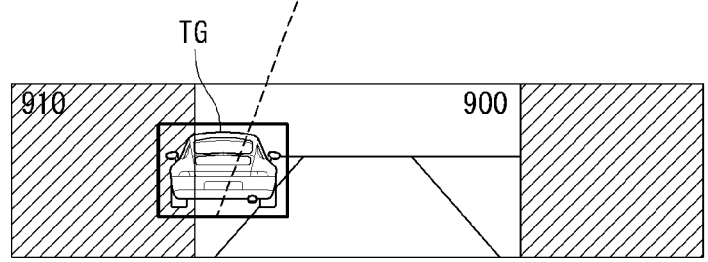
Figure 15C:
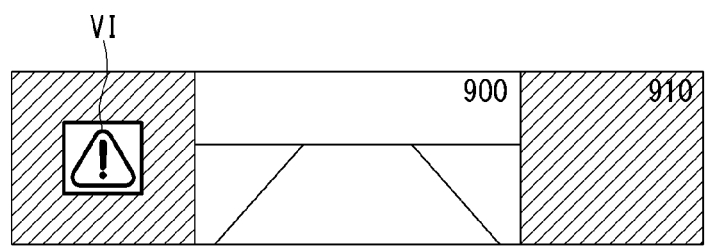

According to FIGS. 15A to 15C, the first camera 510 may sense a vehicle as the target TG. When the target TG is the vehicle, the visual information VI may include a predetermined image as illustrated in FIG. 15C as well as an image representing the vehicle.

According to FIGS. 15A to 15C, when the target TG moves to the non-overlapping area 910, the vehicle may be replaced and displayed by other image. Since the user only needs to know the location information of the target TG, this may be to reduce resources of the vehicle as much as possible.

Figure 16A:
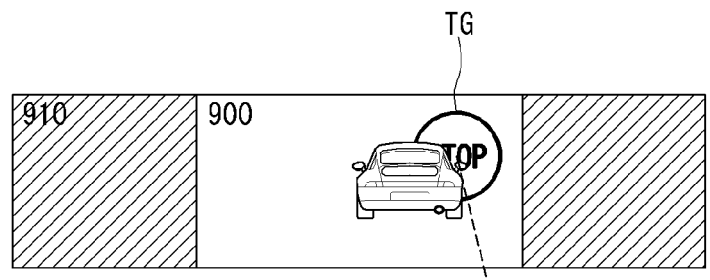
FIGS. 16A, 16B and 16C illustrate examples of visual information according to an embodiment of the present disclosure.
Figure 16B:
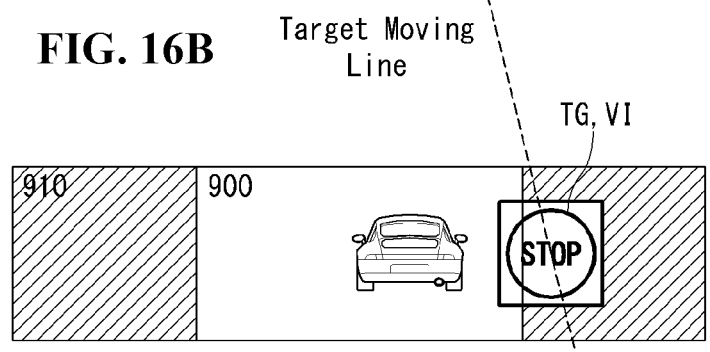
Figure 16C:
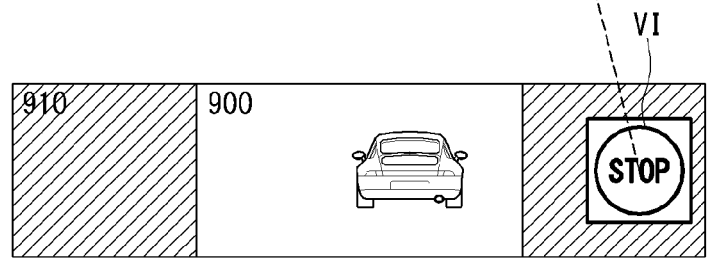

According to FIGS. 16A to 16C, the first camera 510 may sense a sign as the target TG.

According to FIG. 16A, a sign "STOP" is covered by the vehicle. According to FIGS. 16B and 16C, a sign "STOP" moves to the non-overlapping area 910 before it is accurately sensed by the first camera 510. In such a case, the sign "STOP" that is the target TG may be sensed in an image of the second camera 520 through the image recognition algorithm.

However, since there may be no information sensed by the first camera 510 for the sign "STOP", it may be difficult to generate the window 920 as illustrated in FIG. 13. Thus, since the image recognition algorithm must be applied to the entire image of the second camera 520, more resources of the vehicle may be utilized, and this may lead to a reduction in resources to be used for the self-driving, etc.

In order to solve this problem, the vehicle image processing device 600 according to the present disclosure and the vehicle including the same can use the third camera 530. In this instance, the third camera 530 may be a cloud camera used by a map service provider to generate a map.

In order to solve this problem, the vehicle image processing device 600 according to the present disclosure and/or the vehicle including the same can use an image taken by the third camera 530.

That is, when the first camera 510 fails to sense the target TG, information on the target TG may be acquired from the image obtained by the third camera 530, and the visual information VI may be converted based on the acquired information.

For example, when a first operator takes an image of road and buildings around the road to provide a map service, signs around the road may be included in the image taken by the first operator. The first operator may upload the taken image to the cloud (or server). The cloud (or server) may pre-sense sign information of the image taken by the first operator. That is, the cloud (or server) may sense the sign using the image recognition algorithm and sense contents of the sign. The vehicle image processing apparatus 600 and/or the vehicle including the same may receive information on the sign sensed from the cloud (or server) and display the information as visual information VI in the non-overlapping area 910. Since the signs are located at fixed coordinates around the road, separate sensing through the first camera 510 or the second camera 520 may not be required.

Method for Displaying Visual Information on a Display Included in a Vehicle Using the Vehicle Image Processing Device Based on the above description, a method for displaying visual information on a display included in a vehicle using a vehicle image processing device according to a second embodiment of the present disclosure is described in detail below.

The second embodiment of the present disclosure may be described in terms of the vehicle image processing device according to the first embodiment of the present disclosure or a processor 620 included in the vehicle image processing device, or may be described in terms of the vehicle. However, the present disclosure is not limited thereto.

Hereinafter, the same or overlapping contents as the first embodiment of the present disclosure will be omitted in the second embodiment of the present disclosure for convenience of explanation FIGS. 17 to 25 illustrate a method for displaying visual information according to the present disclosure.

Figure 17:
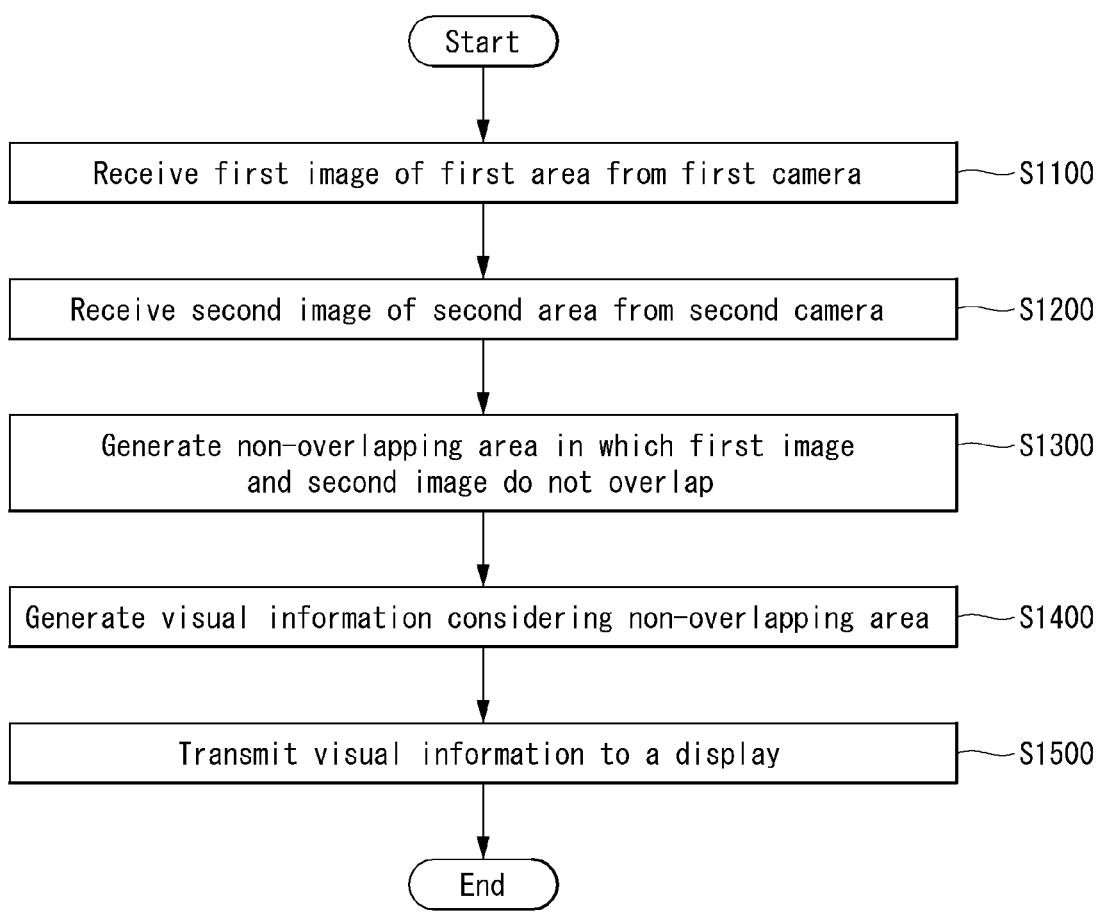
FIGS. 17 to 25 illustrate a method for displaying visual information according to an embodiment of the present disclosure.

According to FIG. 17, a method for displaying visual information VI on a display 700 included in a vehicle according to the present disclosure may comprise a step S1100 of receiving a first image of a first area AR1 from a first camera 510, a step S1200 of receiving a second image of a second area AR2 from a second camera 520, a step S1300 of generating a non-overlapping area 910 in which the first image and the second image do not overlap, a step S1400 of generating the visual information VI considering the non-overlapping area 910, and a step S1500 of transmitting the visual information VI to the display 700. In this instance, the second area AR2 may include at least a portion of the first area AR1. Further, a view angle of the second camera 520 may be wider than a view angle of the first camera 510, and the second image may include the first image.

The step S1300 of generating the non-overlapping area 910 in which the first image and the second image do not overlap may indicate a step of overlapping two images. That is, the non-overlapping area 910 and an overlapping area 900 may be generated at the same time. To this end, there is a need to match a generation time of the first image with a generation time of the second image, and after a specific time is matched, one of a matrix used for the first camera 510 and a matrix used for the second camera 520 may be transformed and matched with another matrix.

The step S1300 of generating the non-overlapping area 910 in which the first image and the second image do not overlap may be performed by a vehicle image processing device 600 or a processor 620, or performed by a cloud (server).

Figure 18:
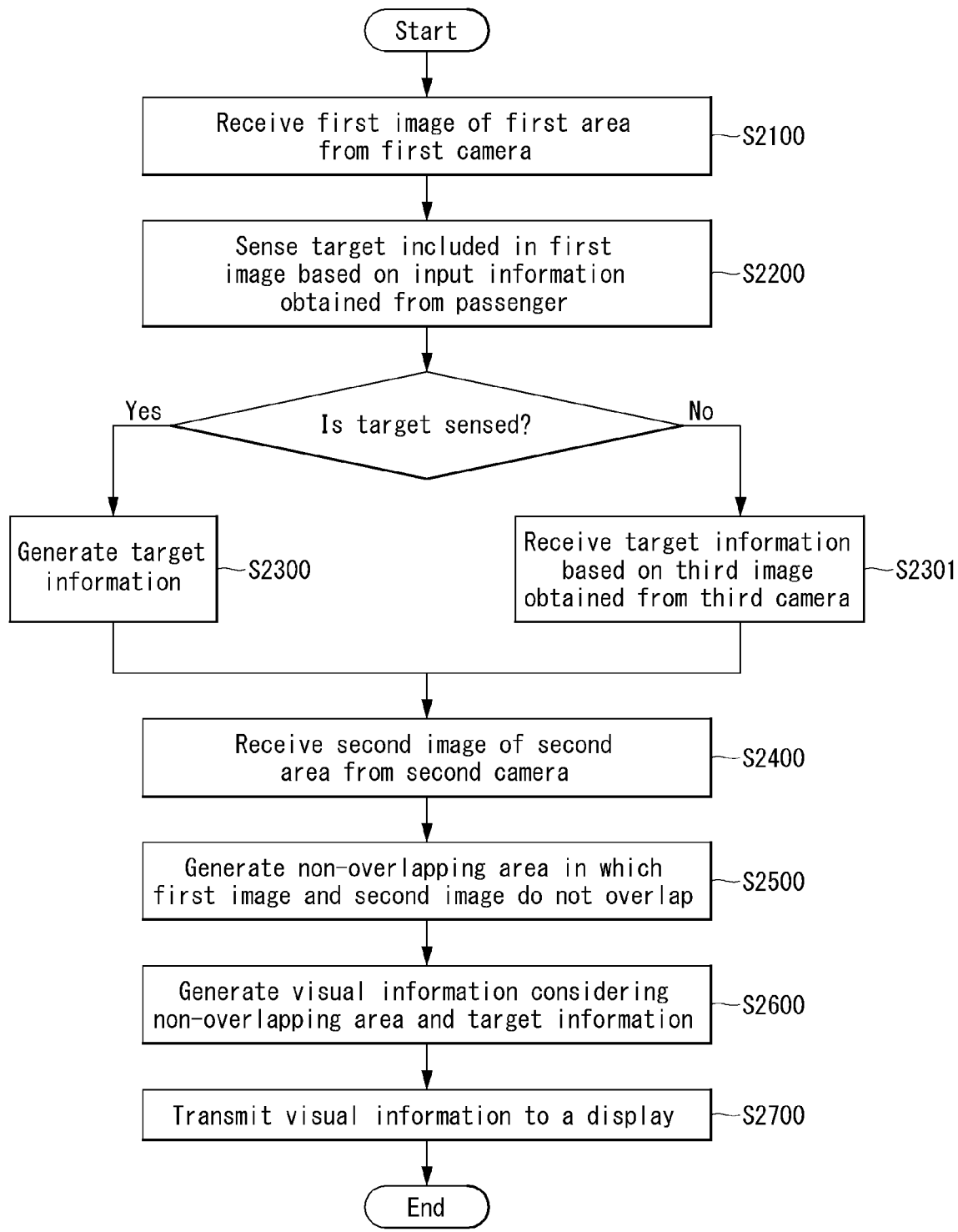

According to FIG. 18, a method for displaying visual information VI on a display 700 included in a vehicle according to the present disclosure may comprise a step S2100 of receiving a first image of a first area AR1 from a first camera 510, a step S2200 of sensing a target TG included in the first image based on input information obtained from a passenger, a step S2300 of generating target information when the target TG is sensed, a step S2400 of receiving a second image of a second area AR2 from a second camera 520, a step S2500 of generating a non-overlapping area 910 in which the first image and the second image do not overlap, a step S2600 of generating the visual information VI considering the non-overlapping area 910 and the target information, and a step S2700 of transmitting the visual information VI to the display 700. The target information may include a type of the target TG (e.g., pedestrian or vehicle), movement of the target TG, coordinate information of the target TG, and the like. The visual information VI may indicate the target TG. The input information may include voice information of the passenger or gaze information of the passenger.

According to FIG. 18, the method may further comprise, when the target TG is not sensed in the first image, a step S2301 of receiving target information based on a third image obtained from a third camera 530. In this instance, the target information may include character information, display information, coordinate information, etc. of the target TG (e.g., a sign).

Figure 19:
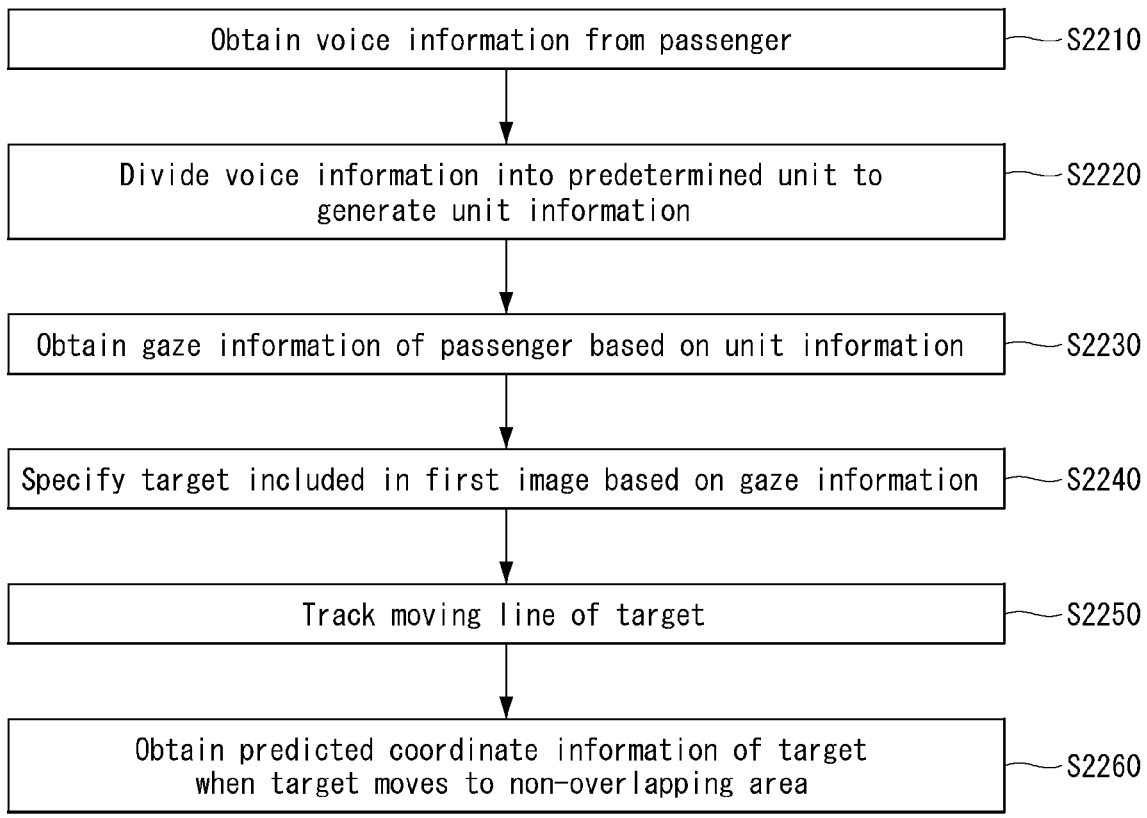
Figure 20:
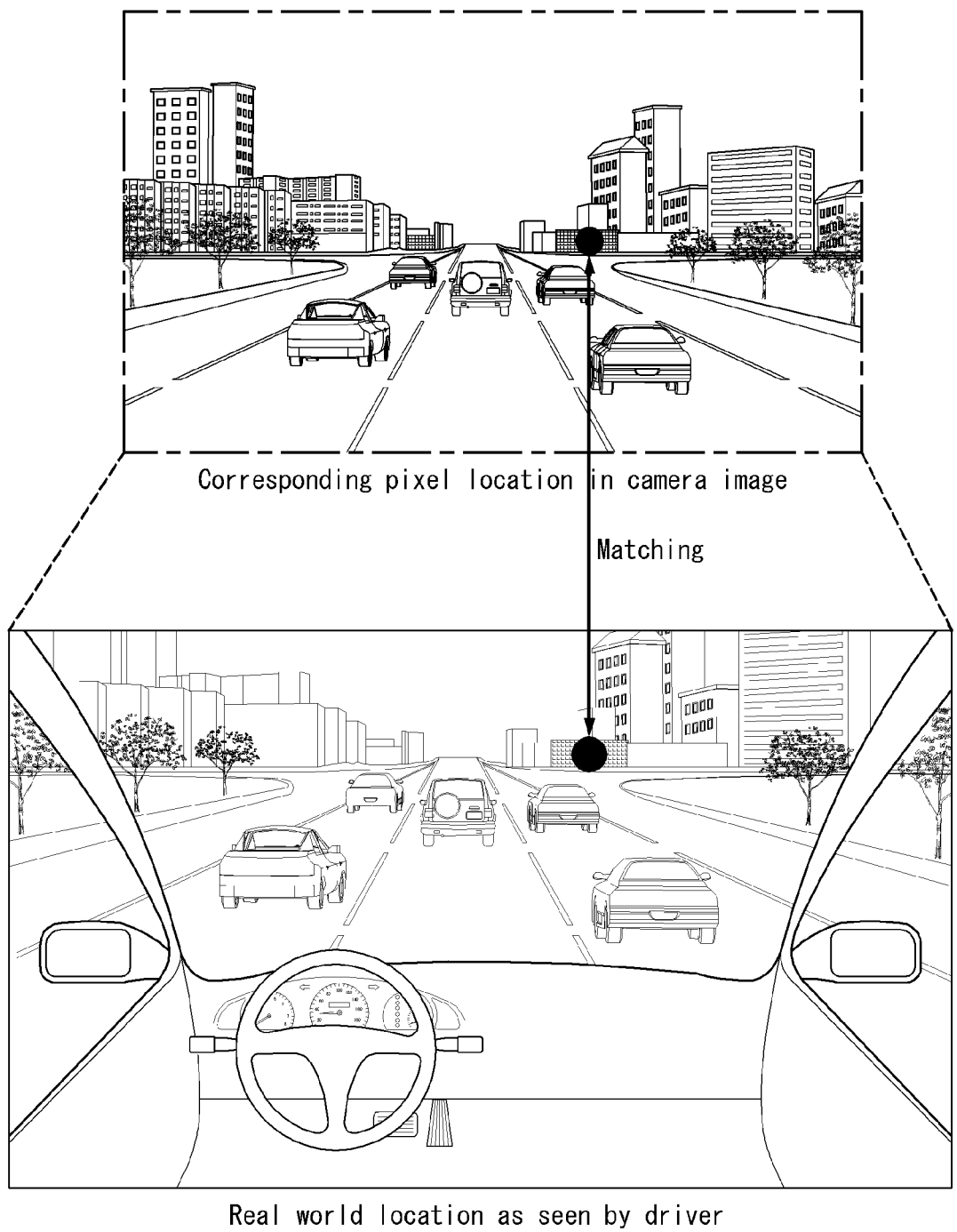

According to FIG. 19, the step S2200 of sensing the target TG included in the first image based on the input information obtained from the passenger may comprise a step S2210 of obtaining voice information from the passenger, a step S2220 of dividing the voice information into a predetermined unit to generate unit information, and a step S2230 of obtaining gaze information of the passenger based on the unit information.

According to FIG. 19, the step S2200 of sensing the target TG included in the first image based on the input information obtained from the passenger may further comprise a step S2240 of specifying the target TG included in the first image based on the gaze information, a step S2250 of tracking a moving line of the target TG, and a step S2260 of obtaining predicted coordinate information of the target TG when the target TG moves to the non-overlapping area 910.

In this instance, the unit information may be a syllable unit or a word unit. Alternatively, the unit information may be several other units such as morphemes. The voice recognition algorithm can recognize voice information based on this unit information.

For example, when the passenger says "What does that mean?" while looking at the sign during driving, the voice recognition algorithm may generate unit information of "what", "that" and "mean". In this case, the vehicle may turn on a front camera correspondingly to "what", detect the letters of the sign in front correspondingly to "that", and obtain the meaning of the letters on the sign correspondingly to "mean". However, this is merely an example, and the voice recognition algorithm can derive the intention of the passenger based on a variety of unit information.

The step S2230 of obtaining the gaze information of the passenger based on the unit information may indicate a step of recognizing the voice information of the passenger through the voice recognition algorithm and determining whether to obtain the gaze information of the passenger according to this result.

That is, the vehicle image processing device 600 or the processor 620 according to the present disclosure may obtain the intention of the passenger through the voice information, and obtain the gaze information based on the obtained result.

The step S2200 of sensing the target TG included in the first image based on the input information obtained from the passenger may further comprise a step S2240 of matching coordinate information of an actual target TG with coordinate information of the target TG in the first image (or the second image), and a step S2250 of defining a point of gaze of the passenger.

Figure 21:
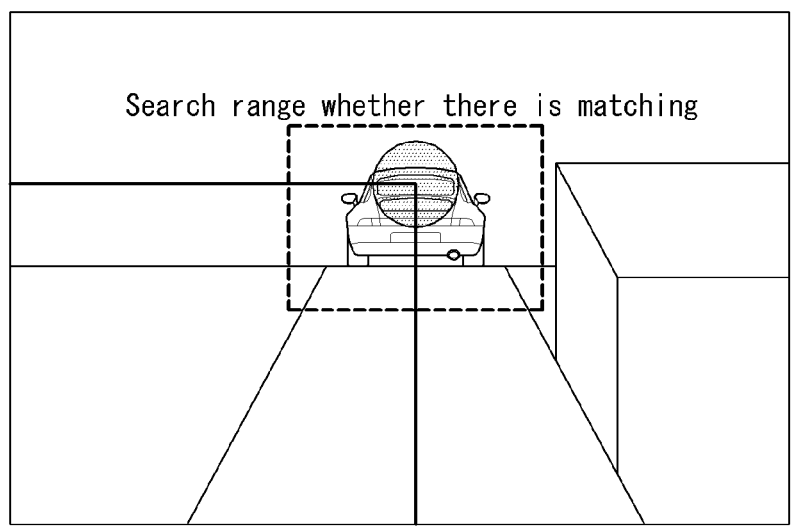

According to FIG. 21, it is possible to match actual location coordinates of the target TG gazed by the passenger with a coordinate point gazed by the passenger in the HUD coordinate system. That is, according to FIG. 20, the step S2250 of defining the point of gaze of the passenger may indicate a step of matching the actual location coordinates of the target TG gazed by the passenger with the coordinate point gazed by the passenger in the HUD coordinate system.

In this instance, matching both coordinates may mean mutually converting three-dimensional spatial coordinates into two-dimensional plane coordinates of an image. Through this, the vehicle image processing device 600 or the processor 620 according to the present disclosure may determine a pixel location on an image corresponding to actual coordinate information of the target TG.

Figure 22:
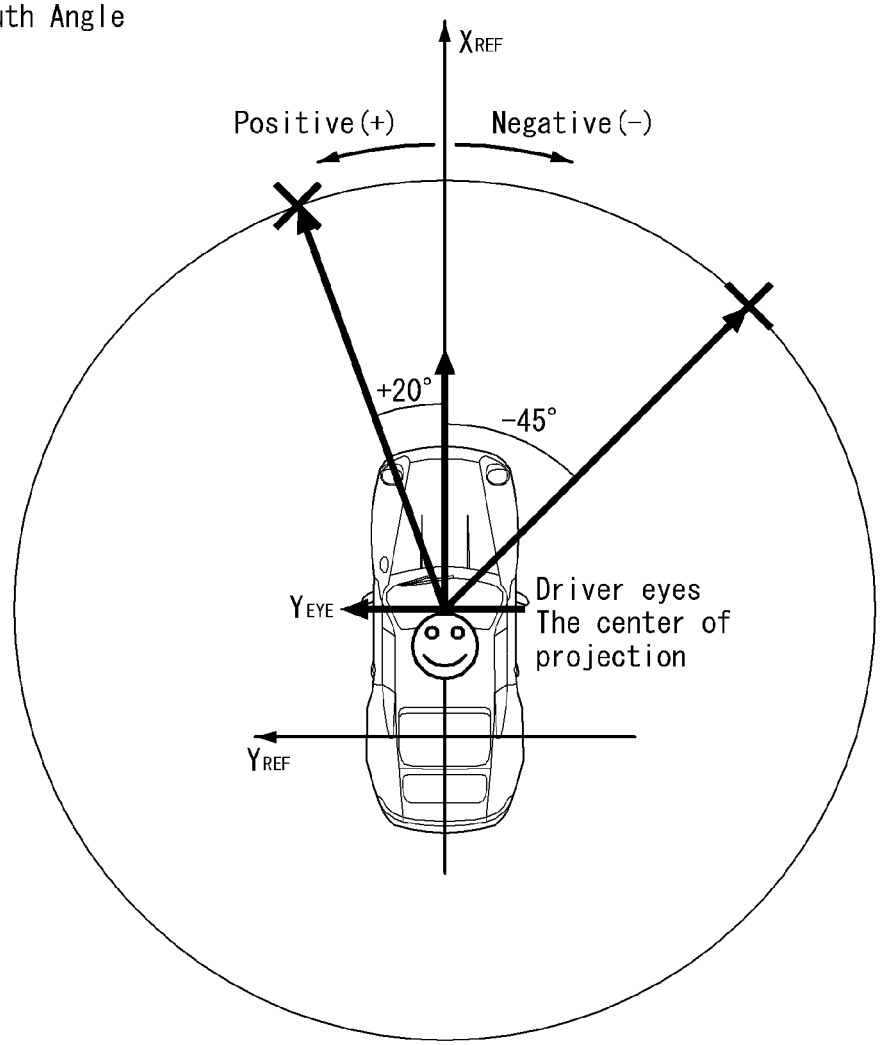
Figure 23:
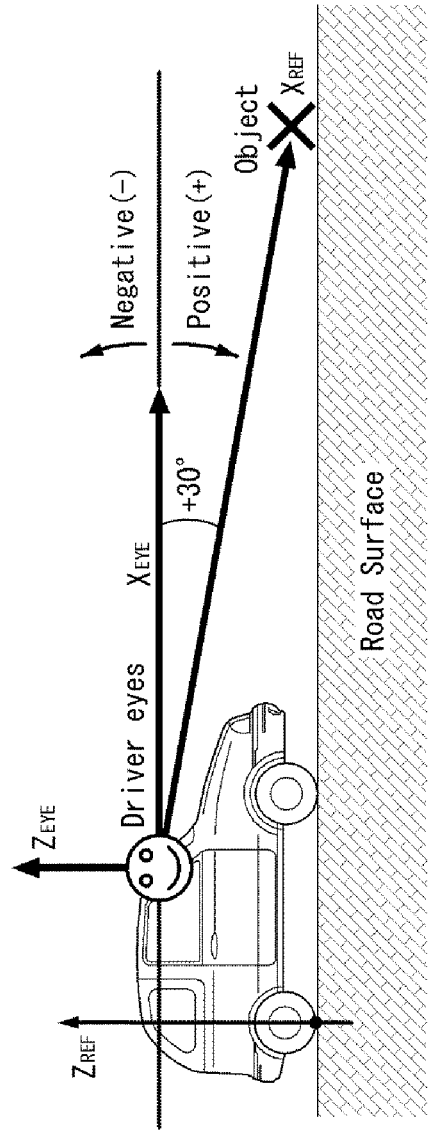

According to FIGS. 22 and 23, the gaze information may include a negative direction and a positive direction that are divided into the left and right based on a driving direction of the vehicle. The gaze information may include information about how much angle the passenger's gaze has at the left and right based on the driving direction of the vehicle.

In addition, the gaze information may include a negative direction and a positive direction that are divided into the up and down based on an eye level of the passenger. The gaze information may further include information about how much angle the passenger's gaze has at the up and down based on the passenger's eye level.

Figure 24:
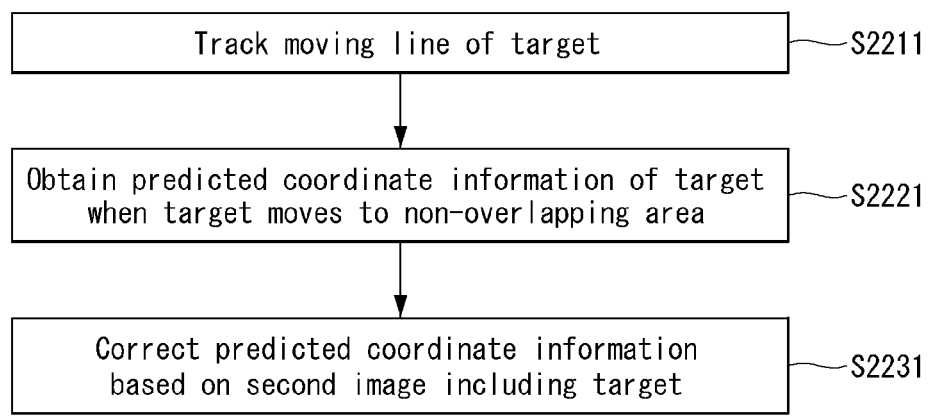

According to FIG. 24, the step S2200 of sensing the target TG included in the first image based on the input information obtained from the passenger may comprise a step S2211 of tracking a moving line of the target TG, a step S2221 of obtaining predicted coordinate information of the target TG when the target TG moves to the non-overlapping area 910, and a step S2231 of correcting the predicted coordinate information based on the second image including the target TG.

Figure 25:
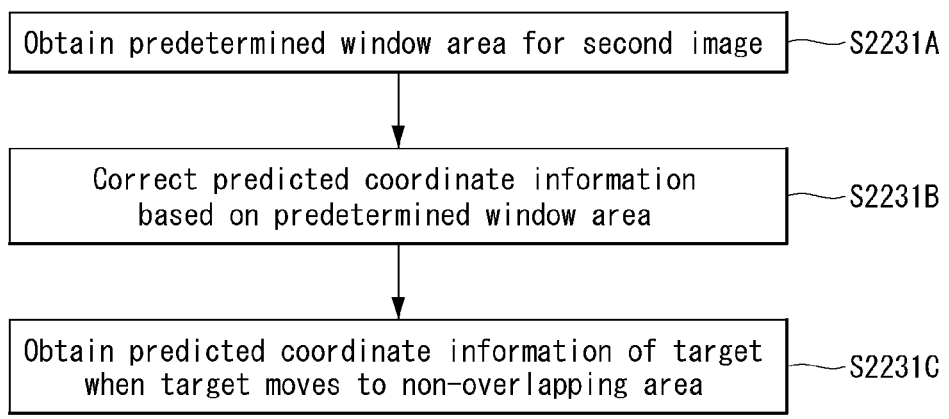

According to FIG. 25, the step S2231 of correcting the predicted coordinate information based on the second image including the target TG may comprise a step S2231A of obtaining an area of a predetermined window 920 for the second image, a step S2231B of correcting the predicted coordinate information based on the area of the predetermined window 920, and a step S2231C of obtaining the predicted coordinate information of the target TG when the target TG moves to the non-overlapping area 910.

Figure 26:
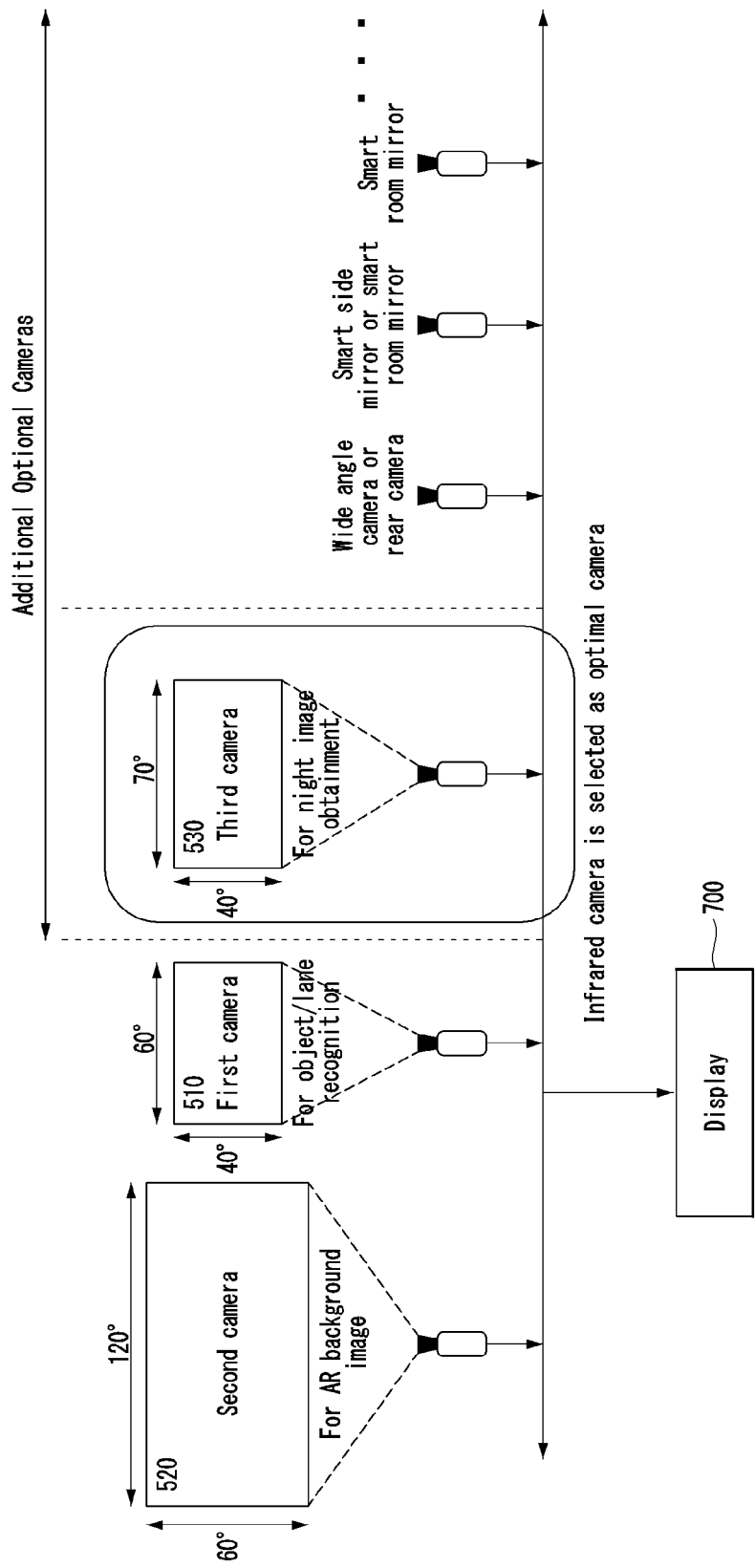
FIGS. 26 to 28 illustrate detailed implementations of a method for displaying visual information using a plurality of cameras according to the present disclosure.
Figure 27:
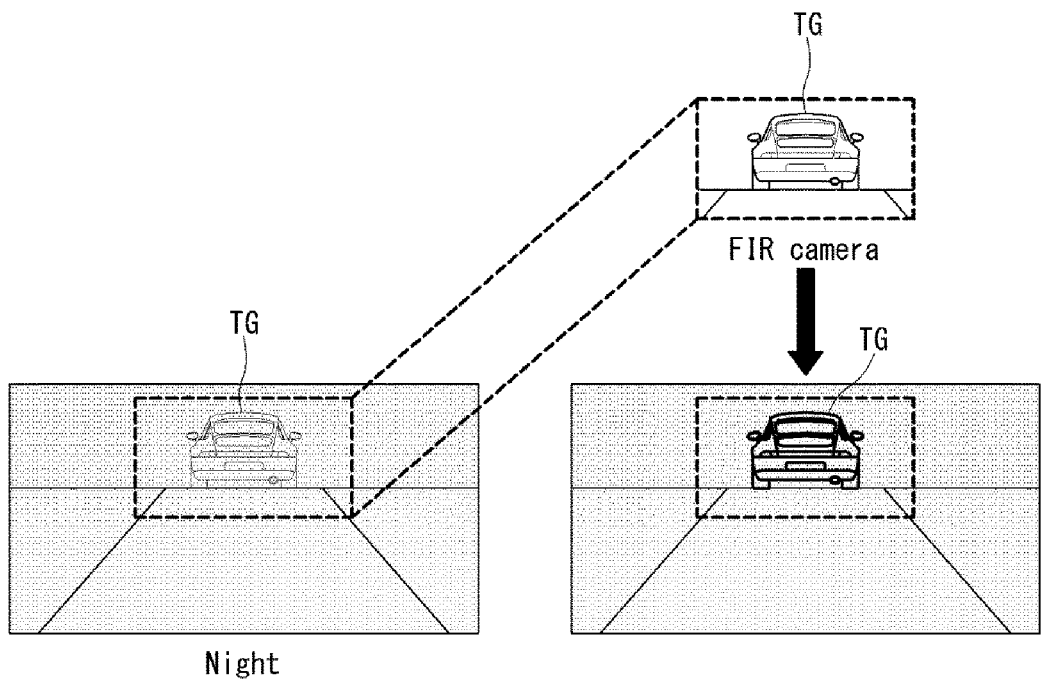
Figure 28:
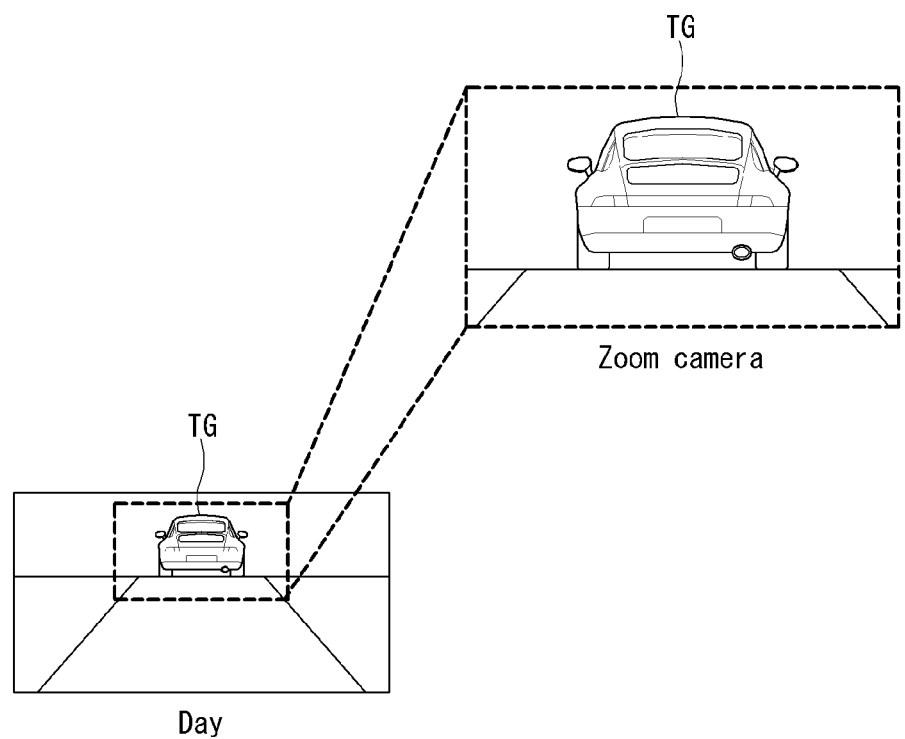

FIGS. 26 to 28 illustrate detailed implementations of a method for displaying visual information using a plurality of cameras according to the present disclosure.

According to FIG. 26, an AR screen may be generated using a plurality of cameras. In particular, the vehicle image processing device 600 according to the present disclosure may obtain a night image using a thermal imaging (FIR) camera and generate the AR screen based on target information based on the night image.

According to FIG. 26, the vehicle image processing device 600 or the processor 620 according to the present disclosure may receive an image (or video) from an infrared camera, a wide-angle camera, a rear camera, a smart side mirror, a smart room mirror, etc. as well as the thermal imaging camera, and generate the AR screen using it. The plurality of cameras may further include a blind spot camera (BSC), a zoo camera, and the like. In this instance, the BSC may be installed on the front, rear, left and right sides of the vehicle.

According to FIG. 26, the vehicle image processing device 600 or the processor 620 according to the present disclosure may select one or more optimal cameras (or the third camera 530), in addition to the first camera 510 and the second camera 520.

For example, when the passenger's gaze is directed toward the left side of the vehicle, and the passenger's gaze information is information including a left direction (or left A-pillar direction), the vehicle image processing device 600 or the processor 620 according to the present disclosure may select a BSC on the left side as the optimal camera. Thus, the vehicle image processing device 600 or the processor 620 may receive an image (or video) from the first camera 510, the second camera 520, and the left BSC and generate the AR screen based on it.

That is, when the passenger's gaze is directed toward the left A-pillar, there occurs a problem in that it is difficult to specify the target TG since it is sensed that the passenger is facing the left A-pillar. Thus, the left BSC may be used to specify the target TG beyond the left A-pillar. The processor 620 according to the present disclosure may obtain the predicted coordinate information of the target TG based on the image (or video) obtained from the left BSC.

According to FIG. 27, if a driving time is after sunset time and before sunrise time, the vehicle image processing device 600 or the processor 620 according to the present disclosure may select the infrared camera as the optimal camera (or the third camera 530).

The vehicle image processing device 600 or the processor 620 may receive an infrared image from the infrared camera. The vehicle image processing device 600 or the processor 620 may sense the target TG based on the infrared image and specify the target TG. A method of sensing or specifying the target TG is the same as or overlaps the above description, and thus a further description is omitted.

Besides, since the second camera 520 may be an RGB camera, it may be difficult to properly take an image with the second camera 520 at night. Thus, the vehicle image processing device 600 or the processor 620 according to the present disclosure may select the infrared camera as the optimal camera (or the third camera 530) and generate the non-overlapping area 910 based on the infrared image. Further, the vehicle image processing device 600 or the processor 620 may display the visual information VI on the non-overlapping area 910 generated based on the infrared image.

According to FIG. 28, when the target TG is located farther than a predetermined distance, the vehicle image processing device 600 or the processor 620 according to the present disclosure may select the zoom camera as the optimal camera (or the third camera 530), sense the target TG based on a zoom image, and specify the target TG. A method of sensing or specifying the target TG is the same as or overlaps the above description, and thus a further description is omitted.

According to FIGS. 27 and 28, the display 700 in the vehicle according to the present disclosure may display the AR screen, and more specifically, may display the AR screen by overlapping the infrared image or the zoom image on the AR screen.

For example, it is assumed that the passenger says "What is that?" while his or her gaze is directed toward the target TG. In this case, the display 700 may display the infrared image on the AR screen at night and display the visual information VI corresponding to the input information of the passenger. In this instance, the visual information VI may be the target TG taken as the infrared image and an image (or video) around the target TG.

For example, it is assumed that the passenger says "What is that?" while his or her gaze is directed toward the target TG. When the target TG is located farther than a predetermined distance, the display 700 may display the zoom image on the AR screen and display the visual information VI corresponding to the input information of the passenger. In this instance, the visual information VI may be a zoom image (or zoo video) including the target TG.

Figure 29:
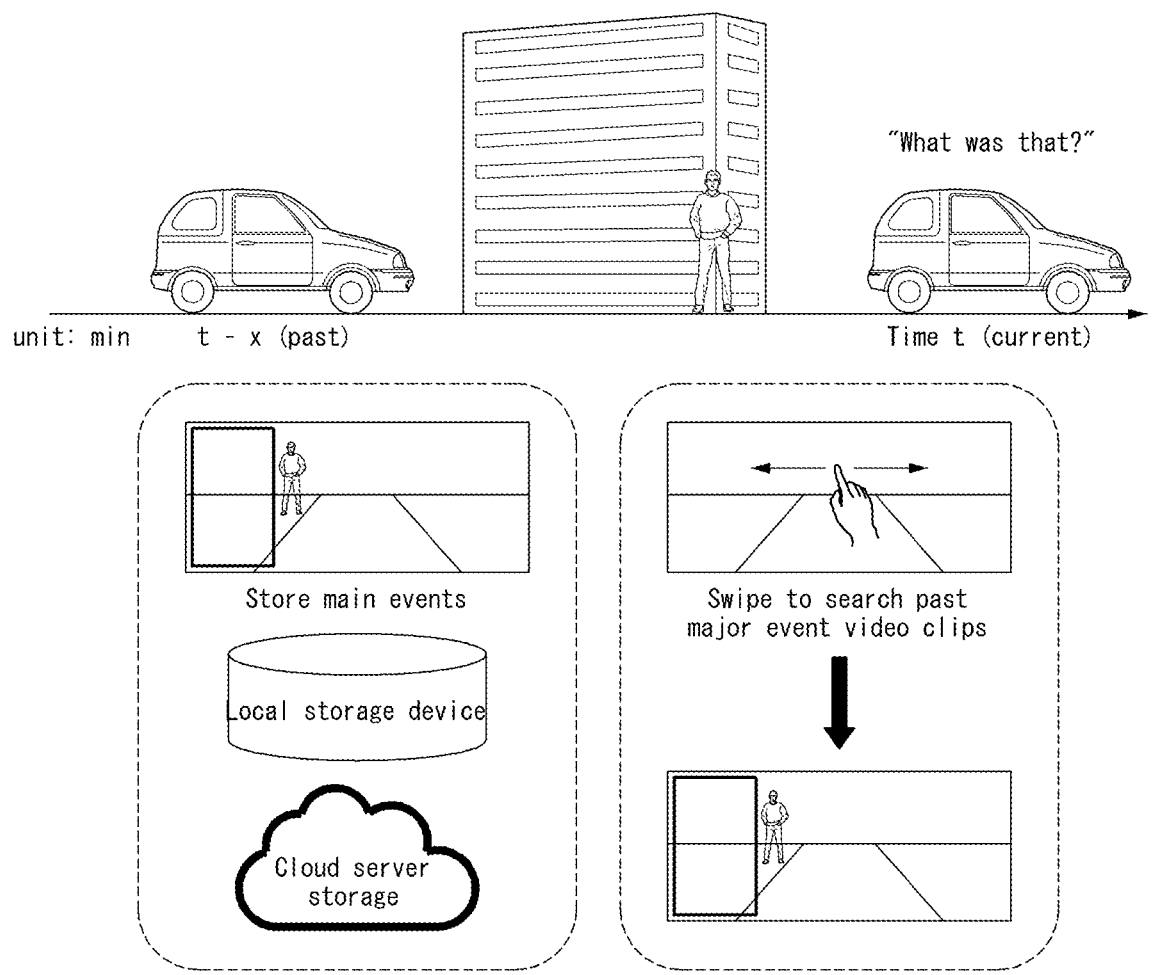
FIG. 29 illustrates an additional scenario according to the present disclosure.

FIG. 29 illustrates an additional scenario according to the present disclosure.

According to FIG. 29, the passenger may see again an event at a specific time. That is, all the images (videos) including both the overlapping area 900 and the non-overlapping area 910 generated by the first camera 510 and the second camera 520 may be stored in a local storage device or a cloud server installed inside the vehicle. The passenger may search the stored past image (or video) and see again the event at the specific time.

According to FIG. 29, while a time x elapsed from a time t-x to a time t (unit: min), the vehicle may store an event passing through buildings. In this instance, the buildings may be displayed in the overlapping area 900 and may be displayed in the non-overlapping area 910 as illustrated in FIG. 10B. If necessary or desired, the passenger may search past events through input such as a swipe.

Detailed Implementations for Improving Visibility of AR Screen

Figure 31:
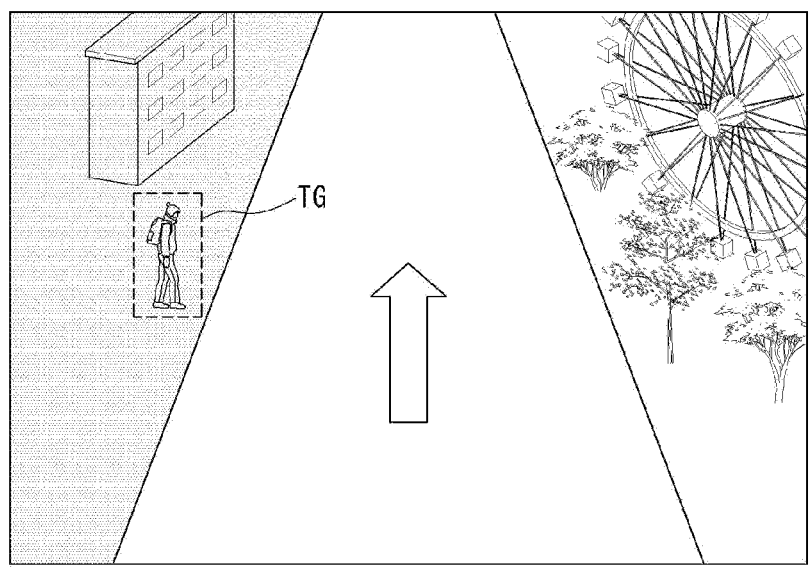

FIGS. 30 and 31 illustrate detailed implementations for visibility improvement in the present disclosure.

According to FIG. 30, a vehicle image processing device according to the present disclosure may use the third camera 530 to improve visibility. The third camera 530 or other cameras may be used, if necessary or desired.

According to FIG. 30, the vehicle image processing device according to the present disclosure may utilize input information of a passenger as conditions for applying the visibility improvement. The vehicle image processing device 600 or the processor 620 according to the present disclosure may obtain intention information of the passenger based on the input information of the passenger.

When the passenger designates or touches a specific target TG on a display screen, the intention information of the passenger may include the content that he or she wants more detailed information about the target TG.

Also, when the passenger looks at the target TG for a predetermined time or longer, the intention information of the passenger may include the content that he/she wants more detailed information about the target TG.

On the contrary, when the passenger does not look at the target TG but makes mention of the target TG by the voice, the intention information of the passenger may include the content that he/she wants rough information about the target TG.

Also, when the passenger makes a predetermined gesture while mentioning or looking at the target TG, the intention information of the passenger may include the content that he/she wants rough information about the target TG.

For example, when the passenger keeps looking at the target TG and says, "It's dark, I can't see it", the vehicle image processing device 600 or the processor 620 according to the present disclosure may select a night vision camera (infrared camera or thermal imaging camera) as the third camera 530 (or optimal camera), and may display a night image obtained from the night vision camera on the AR screen or overlap the night image on the AR screen. That is, the present disclosure may not only display the visual information VI on the non-overlapping area 910, but also further configure an additional screen for visibility improvement or regenerate a new AR screen for visibility improvement.

FIG. 31 illustrates visibility improvement of an AR screen using a night vision camera (infrared camera or thermal imaging camera) according to the present disclosure.

A darkened portion on the left side of FIG. 31 may have low visibility due to shadow, etc. In this instance, the vehicle image processing device 600 or the processor 620 may select a night vision camera as the third camera 530 based on intention information of the passenger.

The vehicle image processing device 600 or the processor 620 may define, in a night vision image (infrared image or thermal imaging image), a portion corresponding to a portion of the second image in which visibility is reduced. The vehicle image processing device 600 or the processor 620 may crop the defined portion to combine it with the second image or to overlap it with the second image.

According to FIG. 31, the vehicle image processing device 600 or the processor 620 may secure the improved visibility and sense that a pedestrian exists in the defined portion. Alternatively, the vehicle image processing device 600 or the processor 620 may sense whether the passenger looks at the pedestrian existing in the defined portion.

Figure 32:
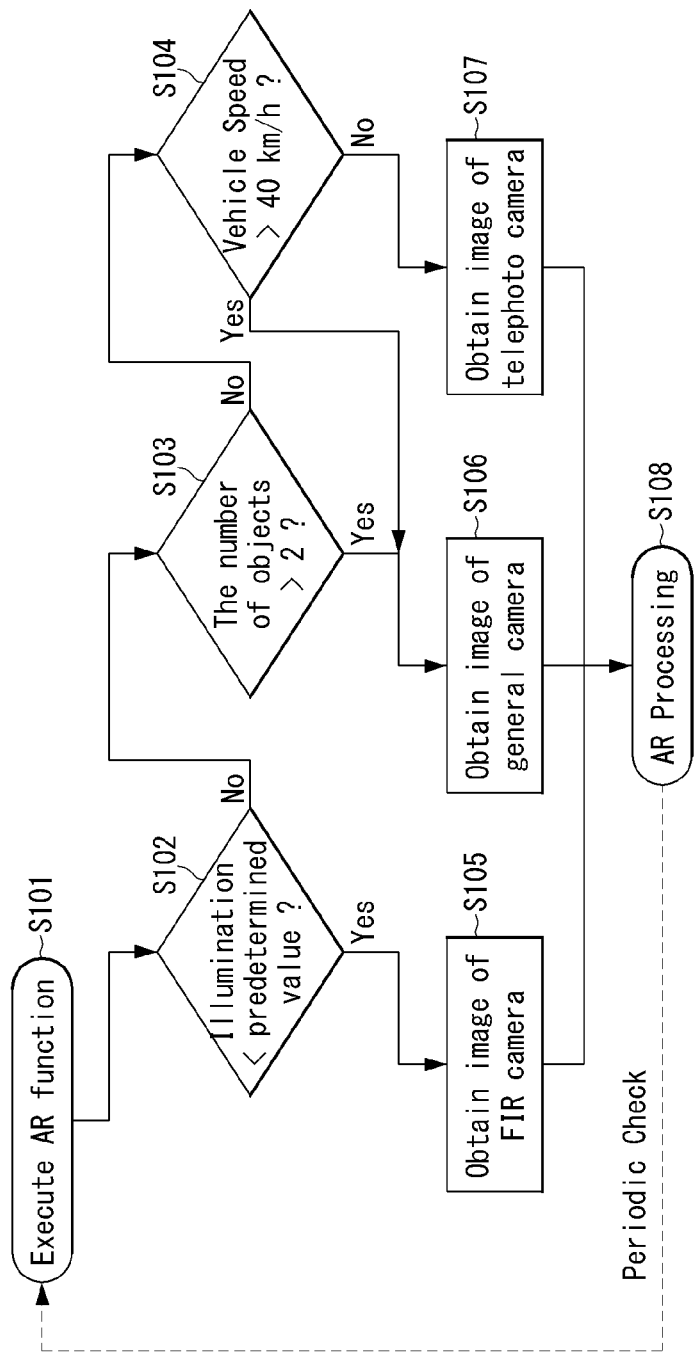
FIG. 32 illustrates a process using a thermal imaging (FIR) camera, a general camera, and a telephoto camera according to the present disclosure.

FIG. 32 illustrates a process using a thermal imaging (FIR) camera, a general camera, and a telephoto camera according to the present disclosure.

According to FIG. 32, when an AR function is executed in S101, and it is checked whether an illumination is less than a predetermined value in S102, the vehicle image processing device 600 may run a thermal imaging (FIR) camera depending on the illumination and obtain an image in S105

When the illumination is equal to or greater than the predetermined value, the vehicle image processing device 600 may check whether the number of objects exceeds a predetermined number (e.g., two) in S103 and run the general camera depending on the number of objects to obtain an image S106.

When the number of objects is equal to or less than the predetermined number, the vehicle image processing device 600 may check whether a speed of the vehicle exceeds a predetermined speed (e.g., 40 km/h) in S104, run the general camera depending on the speed of the vehicle to obtain an image S106. When the speed of the vehicle is equal to or less than the predetermined speed, the vehicle image processing device 600 may run the telephoto camera to obtain an image S107.

The telephoto camera may be replaced with the general camera. An image taken by the telephoto camera may be replaced with an image obtained by applying digital zoom to an image taken by the general camera.

The vehicle image processing device 600 or the processor 620 may receive images taken by the thermal imaging (FIR) camera, the general camera, or the telephoto camera, and may add visual information VI for the AR screen to the received images. The received images may be processed to generate the AR screen. Further, the received images may be combined and displayed on the display.

Figure 33:
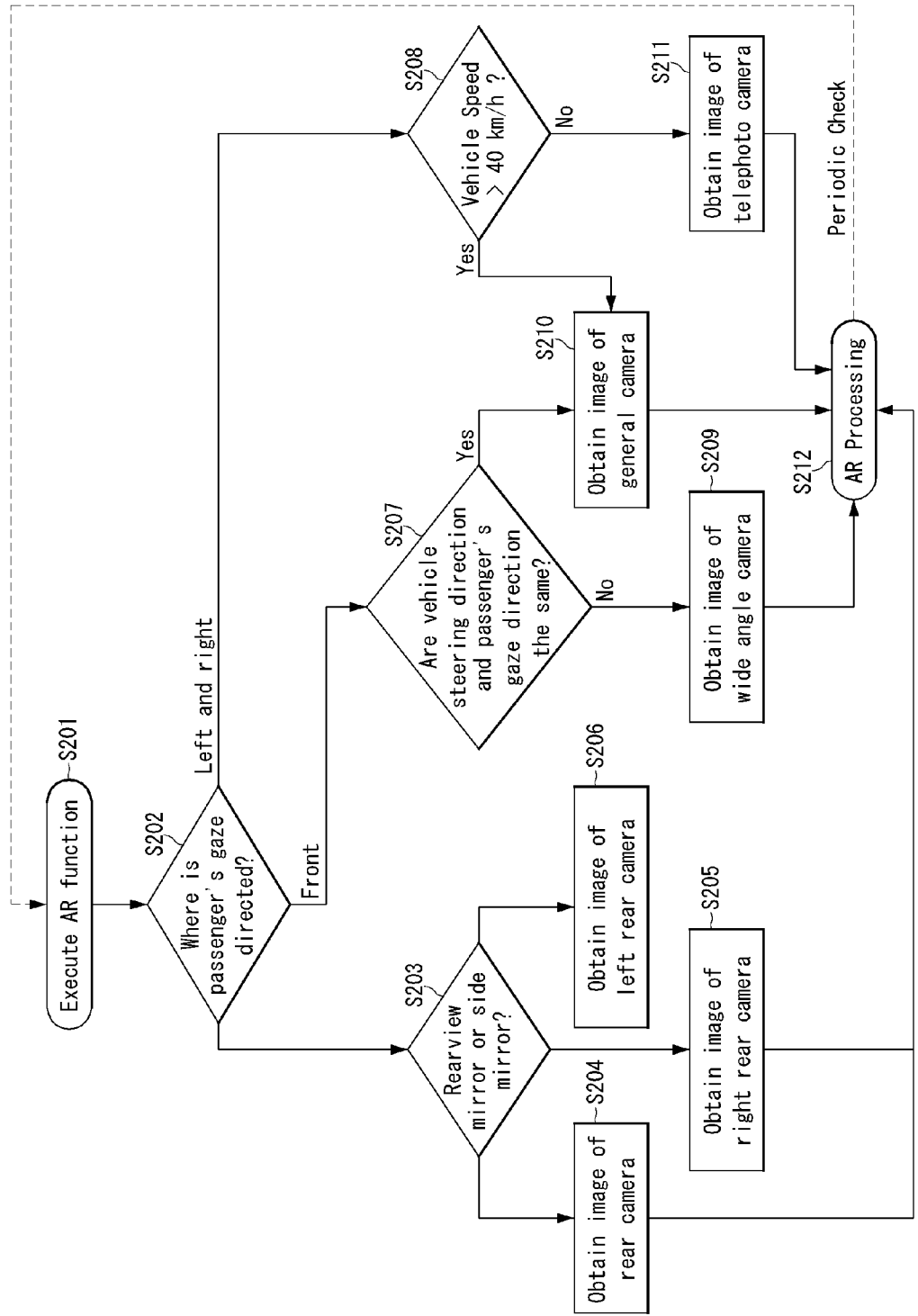
FIG. 33 illustrates a process using a rear camera, a left rear camera, a right rear camera, a wide angle camera, a general camera, and a telephoto camera according to the present disclosure.

FIG. 33 illustrates a process using a rear camera, a left rear camera, a right rear camera, a wide angle camera, a general camera, and a telephoto camera according to the present disclosure.

According to FIG. 33, an AR function may be executed in S201, and the vehicle image processing device 600 or the processor 620 may sense whether a passenger's (particularly, a driver's) gaze is directed toward a rearview minor, a right side mirror, or a left side minor by using an in-vehicle camera in S202.

When the passenger's gaze is directed toward the rearview mirror, the vehicle image processing device 600 or the processor 620 may run the rear camera to obtain an image in S204. When the passenger's gaze is directed toward the right side mirror, the vehicle image processing device 600 or the processor 620 may run the right rear camera to obtain an image in S205. When the passenger's gaze is directed toward the left side mirror, the vehicle image processing device 600 or the processor 620 may run the left rear camera to obtain an image in S206.

The vehicle image processing device 600 or the processor 620 may sense whether the passenger's gaze is directed toward the front or the left and right by using the in-vehicle camera in S202.

When the passenger's gaze is directed toward the front, the vehicle image processing device 600 or the processor 620 may sense whether a vehicle steering direction and a passenger's gaze direction are the same in S207.

When the vehicle steering direction is not the same as the passenger's gaze direction, the vehicle image processing device 600 or the processor 620 may run the wide angle camera to obtain an image in S209. This is to provide an image of a wider view angle. When the vehicle steering direction is the same as the passenger's gaze direction, the vehicle image processing device 600 or the processor 620 may run the general camera to obtain an image in S210.

When the passenger's gaze direction is directed toward the left and right, the vehicle image processing device 600 or the processor 620 may select a camera depending on the speed of the vehicle in S208. When the speed of the vehicle exceeds a predetermined speed (e.g., 40 km/h), the vehicle image processing device 600 may select the general camera to obtain an image in S210. When the speed of the vehicle is equal to or less than the predetermined speed, the vehicle image processing device 600 may select the telephoto camera to obtain an image in S211.

The telephoto camera may be replaced with the general camera. An image taken by the telephoto camera may be replaced with an image obtained by applying digital zoom to an image taken by the general camera.

The vehicle image processing device 600 or the processor 620 may receive images taken by the rear camera, the left rear camera, the right rear camera, the wide angle camera, the general camera, or the telephoto camera, and may add visual information VI for the AR screen to the received images. The received images may be processed to generate the AR screen. Further, the received images may be combined and displayed on the display 700.

Figure 34:
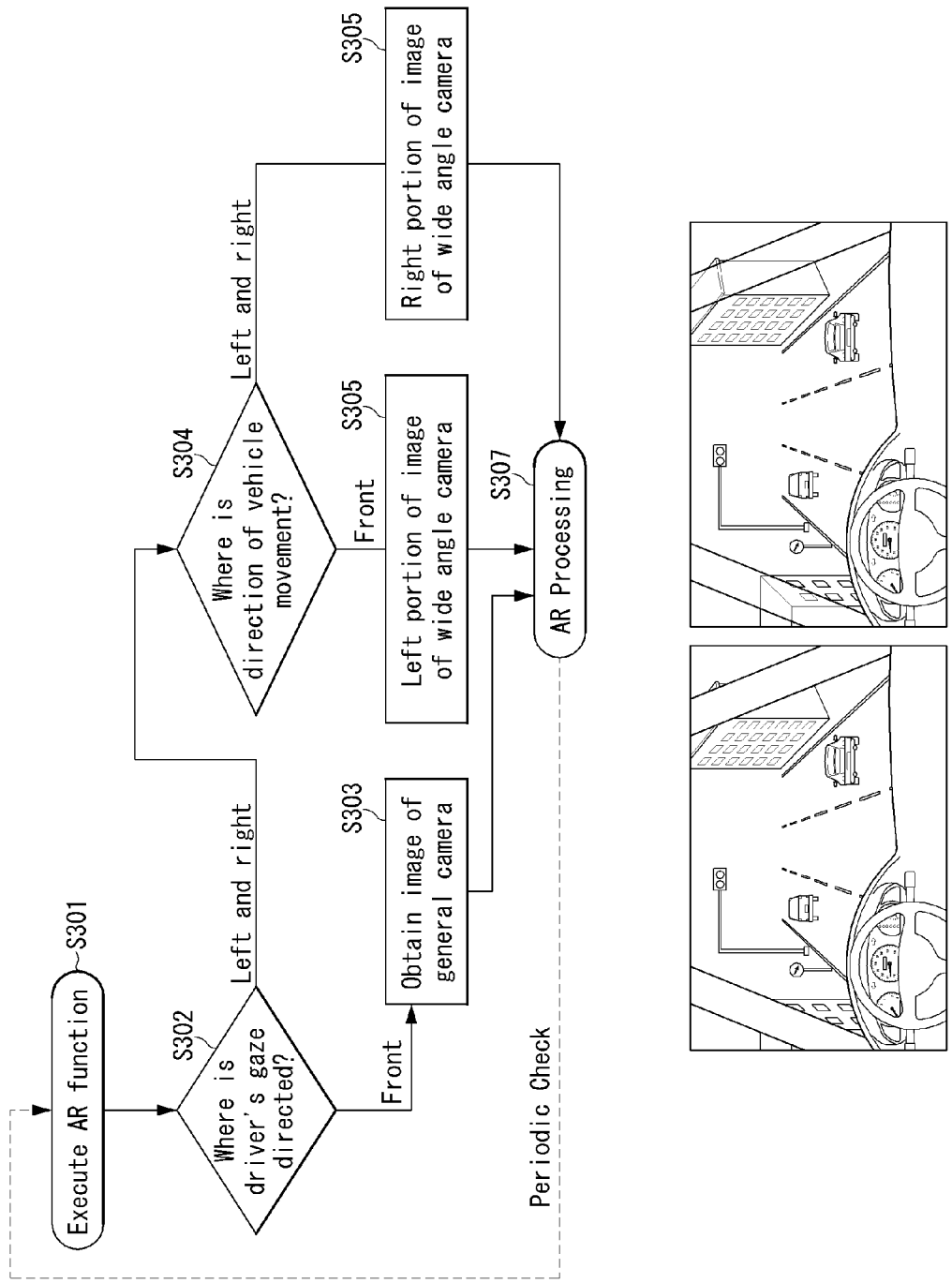
FIG. 34 illustrates a process for generating an AR screen for securing a view of an A-pillar area according to the present disclosure.

FIG. 34 illustrates a process for generating an AR screen for securing a view of an A-pillar area according to the present disclosure.

According to FIG. 34, A-pillars may be positioned on both sides of a windshield of a vehicle. The A-pillar may partially block the passenger's view. Thus, an area covered by the A-pillar may be displayed as an AR screen.

According to FIG. 34, an AR function may be executed in S301, and the vehicle image processing device 600 or the processor 620 may sense whether a passenger's (particularly, a driver's) gaze is directed toward the front or the left and right by using an in-vehicle camera in S302.

When the passenger's gaze is directed toward the front, the vehicle image processing device 600 or the processor 620 may run the general camera to obtain an image in S303.

When the passenger's gaze direction is directed toward the left and right, the vehicle image processing device 600 or the processor 620 may sense a direction of vehicle movement in S304 and run the wide angle camera to obtain an image. In this instance, the vehicle image processing device 600 or the processor 620 may crop a portion of the left or right side of the image obtained by the wide angle camera in S305 and S306

The vehicle image processing device 600 or the processor 620 may receive images taken by the general camera or the wide angle camera and may add visual information VI for the AR screen to the received images. The received images may be processed to generate the AR screen. Further, the received images may be combined and displayed on the display 700.

According to FIG. 34, the area covered by the A-pillar may be supplemented by the received image. The AR screen may include visual information VI for the A-pillar, and the visual information VI for the A-pillar may be displayed transparently or translucently. An area corresponding to the A-pillar in the received image may be displayed by overlapping the visual information VI for the A-pillar. The area corresponding to the A-pillar in the received image may be generated considering the gaze and the location of the passenger.

Next, a method for configuring an AR screen is described in detail based on the above-described embodiments from a perspective of the processor 620.

Figure 35:
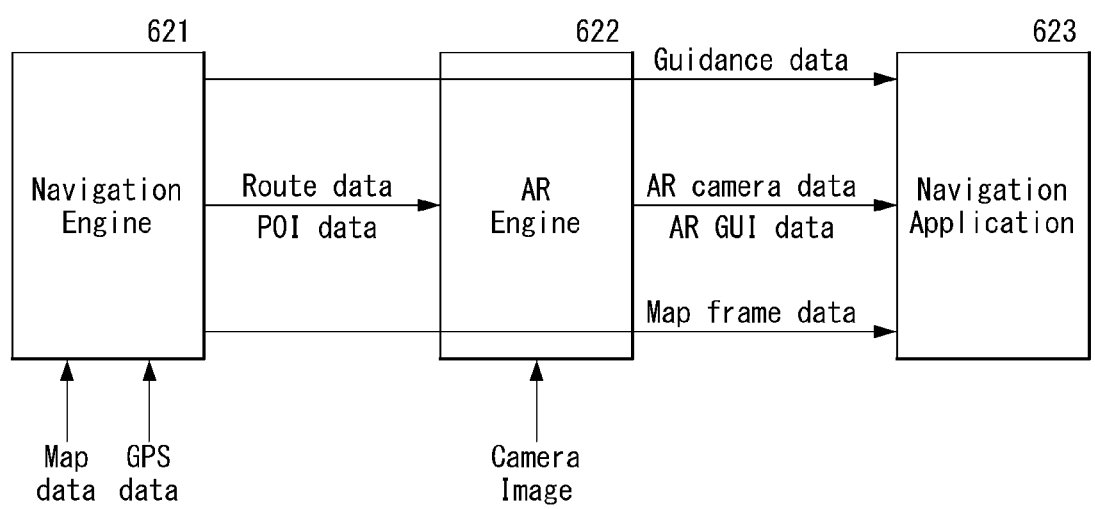
FIG. 35 is a block diagram illustrating configuration of an image processing device.
Figure 36:
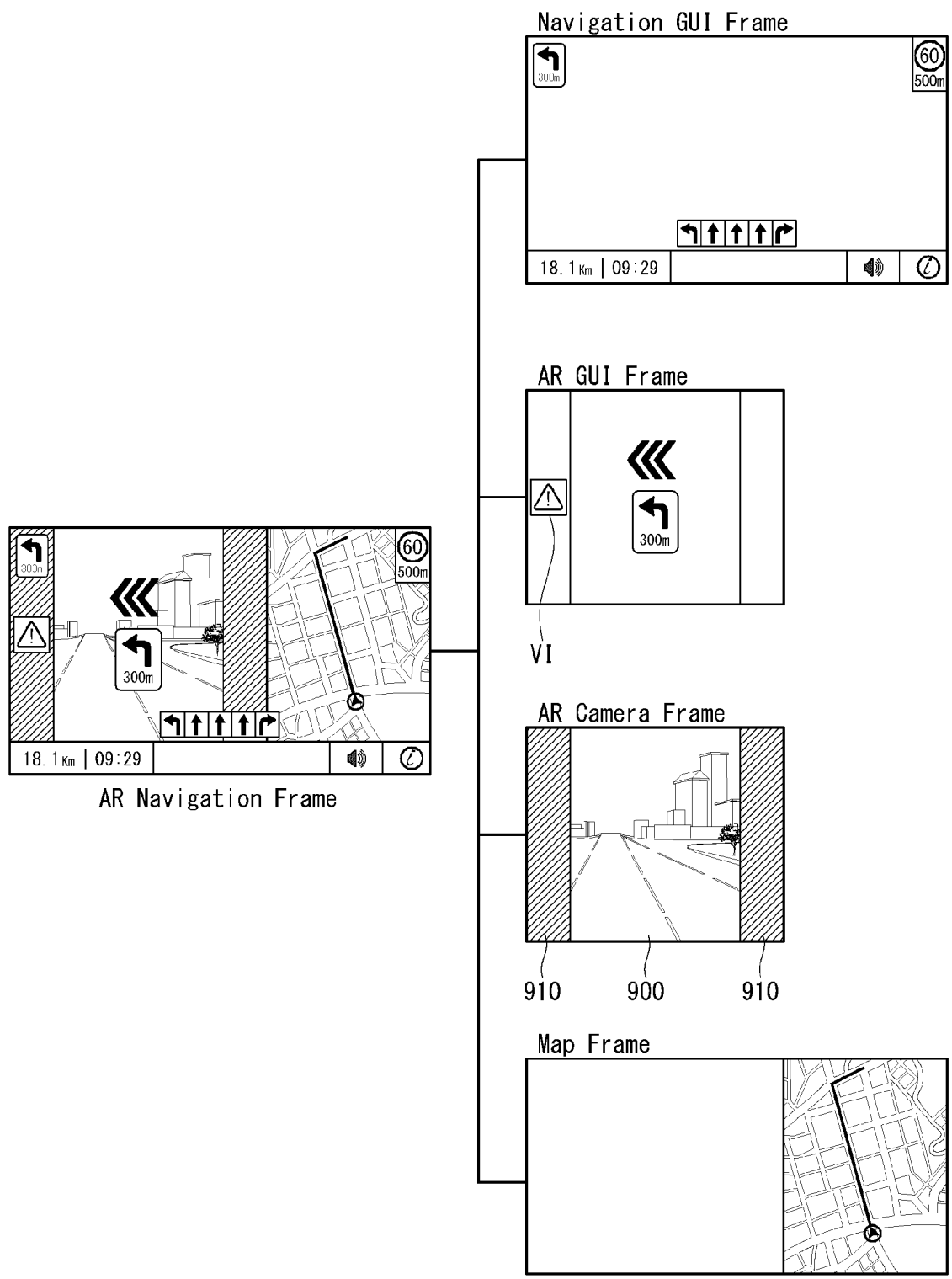
FIG. 36 illustrates an augmented reality screen generated by an image processing device.

FIG. 35 is a block diagram illustrating configuration of an image processing device. FIG. 36 illustrates an augmented reality screen generated by an image processing device.

As illustrated in FIG. 35, the processor 620 according to the present disclosure may include a navigation engine 621, an augmented reality (AR) engine 622, and a navigation application 623. The navigation engine 621 and the AR engine 622 may be referred to as a navigation processor and an AR process, respectively.

The AR engine 622 may be disposed inside a vehicle, or disposed in an external server connected over a network or a communication network.

The navigation engine 621 may receive map data and GPS data and perform map matching to find map matching data corresponding to a current driving position based on the map data and the GPS data. The navigation engine 621 may generate a map screen using the matched map matching data, and may plan a route to a destination and guide the route when a passenger sets the destination. The navigation engine 621 may generate map screen data and route guide data and provide them to the navigation application 623. The navigation engine 621 may provide route data, point of interest (POI) data, etc. to the AR engine 622.

The AR engine 622 may receive image data from one or more cameras and perform calibration or cropping on the image data to generate AR camera data. The AR engine 622 may detect an object based on image data and route data from the camera. The AR engine 622 may generate AR graphical user interface (GUI) data based on the route data, the POI data, etc. and provide the AR GUI data and the AR camera data to the navigation application 623.

As illustrated in FIG. 36, the navigation application 623 may generate an augmented reality (AR) screen including one or more of a map screen, an AR camera screen, an AR GUI screen, and a navigation GUI screen in an overlapped manner. That is, the navigation application 623 may generate the map screen based on the map screen data provided by the navigation engine 621. The navigation application 623 may generate the navigation GUI screen based on the route guide data provided by the navigation engine 621. The navigation application 623 may generate the AR camera screen and the AR GUI screen based on the AR camera data and the AR GUI data provided by the AR engine 622.

If the destination is not set by the user, the augmented reality screen may be composed of only the AR camera screen and the AR GUI screen without a screen related to navigation. In this case, only the AR engine 622 without the navigation engine 621 and the navigation application 623 may generate the AR screen and provide the AR screen to the display 700.

According to the embodiments described above with reference to FIGS. 12 to 28, the AR engine 622 may execute a method of displaying information related to a target TG specified by the passenger on the AR camera screen. Specifically, the AR engine 622 may generate an image or a visual object corresponding to the target TG while obtaining information on the target TG and tracking a movement line of the target TG, and may display it on the AR camera screen. Even if the target TG gets out of an image display area of the AR camera screen on which the target TG is displayed, the AR engine 622 may obtain location information of the target TG and display the location information as visual information.

The AR engine 622 may receive images from a plurality of cameras (e.g., two or more cameras). As described above, the plurality of cameras may include the first camera 510 with an ADAS function and the second camera 520 for configuring the AR screen, such as an RGB camera, and may further include the third camera 530 that will perform an additional function in combination with the first and second cameras.

The first camera 510 can include the ADAS function. Thus, if the AR engine 622 uses the image data provided by the first camera 510, the AR engine 622 may identify a shape, a type, etc. of an object included in an image taken by the first camera 510 even using a small amount of computing power and obtain a distance to the object or location information.

As illustrated in FIGS. 9A and 9B, since the view angle of the first camera 510 is narrower than the view angle of the second camera 520, the first image of the first area AR1 taken by the first camera 510 may partially overlap the second image of the second area AR2 taken by the second camera 520, or all the first image may be included in the second image.

The AR engine 622 may combine the first image taken by the first camera 510 and the second image taken by the second camera 520 to generate one AR camera screen. As illustrated in FIGS. 10A and 10B, the AR engine 622 may configure the AR camera screen to be fit to a screen size of the display 700 or to be fit a size of an area in which the camera image is to be displayed on the display 700 by using the image of the first camera 510 and the image of the second camera 520. In this case, the AR camera screen may be configured such that it includes an overlapping area 900 and a non-overlapping area 910 between the image of the first camera 510 and the image of the second camera 520.

When the AR engine 622 configures the AR camera screen, a portion of the non-overlapping area between the image of the first camera 510 and the image of the second camera 520, for example, portions located above and below of the overlapping area 900 may be cropped, and left and right portions that are not cropped may be disposed, as the non-overlapping area 910, on the left and right sides of the overlapping area 900. The AR engine 622 may express main objects of the non-overlapping area 910 as simple symbol images, instead of displaying an actual image taken by the second camera 520 on the non-overlapping area 910.

If the passenger specifies the target TG among objects in the overlapping area 900 of the AR camera screen, the AR engine 622 may obtain information such as shape, type, location, and distance of the target TG from first image data by the first camera 510, and generate AR GUI data including visual information VI corresponding to the target TG based on the information. In this case, the AR engine 622 may determine location information, on which the corresponding AR GUI will be displayed, so that the corresponding AR GUI is displayed at a location where the target TG is present in the overlapping area 900. The location of the target TG obtained from the first image data corresponds to a location where the target TG is displayed on the overlapping area 900.

The AR engine 622 may transmit an image of an area, that the passenger specifies in the overlapping area 900, to the external server connected to the network, and may receive, from the external server, information on the target TG included in the corresponding area, for example, a type of the target TG and visual object data to visually express the target TG.

Implementations in which the passenger specifies the target TG can be replaced by FIGS. 19 to 23 and the description related to the figures, and thus an addition description thereof is omitted.

If the target TG, that is specified by the passenger and is represented as AR GUI in the overlapping area 900 of the AR camera screen, moves to the non-overlapping area 910, the first camera 510 whose view angle does not reach the non-overlapping area 910 cannot sense the target TG. As described above with reference to FIGS. 11A to 15C, the AR engine 622 may continuously extract information on the target TG based on the first image data transmitted from the first camera 510 while the target TG is displayed as the AR GUI in the overlapping area 900; calculate an estimated position of the target TG in the non-overlapping area 910 based on the extracted information on the target TG; and generate the AR GUI data so that a visual object corresponding to the target TG is displayed at the calculated position in the non-overlapping area 910.

In this instance, the AR engine 622 may set a window 920 around an estimated position of the target TG entering the non-overlapping area 910 in the second image taken and provided by the second camera 520 and apply an image recognition algorithm only to the set window 920 to sense the target TG. Hence, the AR engine 622 can more accurately detect the position of the target TG and continue to track the target TG using only a small amount of resources.

The AR engine 622 may differently represent an AR GUI indicating the target TG according to circumstances when generating the AR GUI for the target TG moving to the non-overlapping area 910. The AR engine 622 may generate the AR GUI as a symbol image denoting a type of the target TG and also adjust a size of the AR GUI depending on a distance between the vehicle and the target TG.

The AR engine 622 may differently adjust a size of a visual object, i.e., AR GUI to be displayed on the overlapping area 900 or the non-overlapping area 910 depending on the type of the target TG. For example, the AR engine 622 may generate a relatively small visual object for fixed objects such as traffic lights or signs, and generate a relatively large visual object for moving objects to attract the attention of the passenger.

When main objects move to the non-overlapping area 910 from the overlapping area 900, in a state in which the corresponding main objects are not specified as the target TG by the passenger when the corresponding main objects (e.g., traffic lights, signs, etc.) are present in the overlapping area 900, and thus the AR engine 622 does not detect information about the corresponding main objects as target TG information from the first image data of the first camera 510, or does not track positions of the corresponding main objects, in order to represent the corresponding main objects in the non-overlapping area 910, the AR engine 622 may obtain information on the corresponding object from an image provided by the third camera 530, such as a cloud camera, and generate an AR GUI including a symbol image based on the information. Alternatively, when the AR engine 622 represents main objects of the non-overlapping area 910 as symbol images, the AR engine 622 may generate an AR GUI using POI provided by the navigation engine 621.

When the AR engine 622 configures the AR camera screen, the AR engine 622 may generate an image of the overlapping area 900 using an image provided by a thermal imaging (FIR) camera, an infrared camera, a BSC camera, a telephoto camera, etc., instead of or in addition to the second image provided by the second camera 520 that photographs the front of a vehicle in RGB, depending on circumstances (e.g., when it is night in which a illumination is lowered, when it is sunrise or sunset time, when the passenger's gaze is directed in other direction not the front, or when the target TG is farther than a predetermined distance), thereby improving visibility.

The present disclosure may be summarized as follows.

An image processing device according to an embodiment of the present disclosure may comprise a memory configured to store a first image transmitted from a first camera and a second image transmitted from a second camera with a wider view angle than the first camera; and a processor configured to process the first and second images stored in the memory. The processor may be configured to, when a target is specified in a first area in which the first image and the second image overlap each other within an augmented reality screen generated based on at least one of the first and second images, extract target information on the target based on data for the first image; generate augmented reality data based on the extracted target information so that a visual object corresponding to the target is displayed on the first area; and when the target gets out of the first area and enters a second area of the augmented reality screen, track a position of the target based on the extracted target information and generate the augmented reality data so that the visual object is displayed on the second area.

In an embodiment, the processor may configure the augmented reality screen to fit a screen size of a display based on the first image and the second image, and the augmented reality screen may include the first area in which the first image and the second image overlap each other and the second area in which the first image and the second image do not overlap each other.

In an embodiment, the processor may crop upper and lower portions of the first area, in which the first image and the second image overlap each other, and generate left and right portions of the first area as the second area in an area in which the first image and the second image do not overlap each other. Further, the processor may generate, in the second area, symbol images for objects of the second area.

In an embodiment, the memory may receive a third image from a third camera and store the third image, and the processor may obtain object information on objects in the second area from the third image and generate, as the augmented reality data, symbol images for the objects to be displayed on the second area based on the object information.

In an embodiment, the target information may include one or more of a shape, a type, a position, and a distance of the target.

In an embodiment, the processor may change a size of the visual object based on a distance to the target or the type of the target.

In an embodiment, the processor may, when the target enters the second area, correct the position of the target in the second area based on the second image corresponding to the second area.

In an embodiment, the processor may specify a target included in the first image based on input information obtained from a passenger, and the input information may include at least one of voice information, gaze information, gesture information and touch information of the passenger.

In an embodiment, the processor may obtain the voice information from the passenger, obtain the gaze information of the passenger based on the voice information, and specify a target corresponding to the gaze information in the first image.

In an embodiment, the memory may receive a fourth image from a fourth camera and store the fourth image, and the processor may generate an image of the first area using the fourth image in addition to the first and second images or instead of the first and second images.

In an embodiment, the processor may transmit, to a server, image data of an area specified by the passenger in the first area and receive, from the server, a type of a target included in the specified area and a visual object of the target.

An image processing method according to another embodiment of the present disclosure may comprise receiving a first image and a second image from a first camera and a second camera with a wider view angle than the first camera, respectively; when a target is specified in a first area in which the first image and the second image overlap each other within an augmented reality screen generated based on at least one of the first and second images, extracting target information on the target based on data for the first image; generating augmented reality data based on the extracted target information so that a visual object corresponding to the target is displayed on the first area; and when the target gets out of the first area and enters a second area of the augmented reality screen, tracking a position of the target based on the extracted target information and generating the augmented reality data so that the visual object is displayed on the second area.

In an embodiment, the image processing method may further comprise configuring the augmented reality screen to fit a screen size of a display based on the first image and the second image, wherein the augmented reality screen is configured to include the first area in which the first image and the second image overlap each other and the second area in which the first image and the second image do not overlap each other. Configuring the augmented reality screen may comprise cropping upper and lower portions of the first area, in which the first image and the second image overlap each other, in an area in which the first image and the second image do not overlap each other; generating left and right portions of the first area as the second area in the area in which the first image and the second image do not overlap each other; and generating, in the second area, symbol images for objects of the second area.

In an embodiment, the image processing method may further comprise receiving a third image from a third camera; obtaining object information on objects in the second area from the third image; and generating, as the augmented reality data, symbol images for the objects to be displayed on the second area based on the object information.

In an embodiment, the target information may include one or more of a shape, a type, a position, and a distance of the target, and a size of the visual object may be changed based on a distance to the target or the type of the target.

In an embodiment, the image processing method may further comprise, when the target enters the second area, correcting the position of the target in the second area based on the second image corresponding to the second area.

In an embodiment, the image processing method may further comprise specifying a target included in the first image based on input information obtained from a passenger. The input information may include at least one of voice information, gaze information, gesture information and touch information of the passenger.

In an embodiment, the image processing method may further comprise receiving a fourth image from a fourth camera; and generating an image of the first area using the fourth image in addition to the first and second images or instead of the first and second images.

In an embodiment, the image processing method may further comprise transmitting, to a server, image data of an area specified by the passenger in the first area; and receiving, from the server, a type of a target included in the specified area and a visual object of the target.

An image processing device according to another embodiment of the present disclosure may comprise a first camera configured to output a first image; a second camera configured to output a second image with a wider view angle than the first camera; a memory configured to store the first image and the second image; a processor configured to generate an augmented reality screen based on at least one of the first and second images stored in the memory and generate augmented reality data for a specified target in the first image; and a display configured to display the augmented reality data by overlapping the augmented reality data with the augmented reality screen. The processor may be configured to, when the target is specified in a first area in which the first image and the second image overlap each other within the augmented reality screen, extract target information on the target based on data for the first image; generate the augmented reality data based on the extracted target information so that a visual object corresponding to the target is displayed on the first area; and when the target gets out of the first area and enters a second area of the augmented reality screen, track a position of the target based on the extracted target information and generate the augmented reality data so that the visual object is displayed on the second area.

The present disclosure described above can be implemented using a computer-readable medium with programs recorded thereon for execution by a processor to perform various methods presented herein. The computer-readable medium includes all kinds of recording devices capable of storing data that is readable by a computer system. Examples of the computer-readable mediums include hard disk drive (HDD), solid state disk (SSD), silicon disk drive (SDD), ROM, RAM, CD-ROM, a magnetic tape, a floppy disk, an optical data storage device, the other types of storage mediums presented herein, and combinations thereof. If desired, the computer-readable medium may be implemented in the form of a carrier wave (e.g., transmission over Internet). Thus, the foregoing description is merely an example and is not to be considered as limiting the present disclosure. The scope of the present disclosure should be determined by rational interpretation of the appended claims, and all changes within the equivalent range of the present disclosure are included in the scope of the present disclosure.

Although the present disclosure has been described focusing on the above-described embodiments, they are merely examples and do not limit the present disclosure. Thus, those skilled in the art to which the present disclosure pertains will know that various modifications and applications which have not been exemplified can be performed within the range without departing from the essential features of these embodiments. For example, each component described in detail in embodiments can be modified and implemented. Further, the differences related to such modifications and applications shall be construed to be included in the scope of the present disclosure described in the appended claims.

What is claimed is:

1. An image processing device comprising:
   a memory configured to store a first image transmitted from a first camera and a second image transmitted from a second camera with a wider view angle than the first camera; and
   a processor configured to process the first and second images stored in the memory,
   wherein the processor is configured to:
      based on a target being specified in a first area in which the first image and the second image overlap each other within an augmented reality screen generated based on at least one of the first image or the second image, extract target information regarding the target based on data for the first image;
      generate augmented reality data based on the extracted target information so that a visual object corresponding to the target is displayed on the first area; and
      based on the target exiting the first area and entering a second area of the augmented reality screen, track a position of the target based on the extracted target information and generate the augmented reality data so that the visual object is displayed on the second area, wherein the processor is further configured to configure the augmented reality screen to fit a screen size of a display based on the first image and the second image, wherein the augmented reality screen is configured to include (i) the first area in which the first image and the second image overlap each other and (ii) the second area in which the first image and the second image do not overlap each other, wherein the processor is further configured to crop upper and lower portions of the first area, in which the first image and the second image overlap each other, and generate left and right portions of the first area as the second area in an area in which the first image and the second image do not overlap each other, and wherein the processor is further configured to generate, in the second area, symbol images for objects of the second area.

2. The image processing device of claim 1, wherein the memory is further configured to receive a third image from a third camera and store the third image, and wherein the processor is further configured to:
obtain object information regarding objects in the second area from the third image, and
generate, as the augmented reality data, symbol images for the objects to be displayed on the second area based on the object information.

3. The image processing device of claim 1, wherein the target information includes at least one of a shape, a type, a position, or a distance of the target.

4. The image processing device of claim 3, wherein the processor is further configured to change a size of the visual object based on a distance to the target or the type of the target.

5. The image processing device of claim 1, wherein the processor is further configured to, based on the target entering the second area, correct the position of the target in the second area based on the second image corresponding to the second area.

6. The image processing device of claim 1, wherein the processor is further configured to specify a target included in the first image based on input information obtained from a passenger, and
wherein the input information includes at least one of voice information, gaze information, gesture information, or touch information of the passenger.

7. The image processing device of claim 1, wherein the memory is further configured to receive a fourth image from a fourth camera and store the fourth image, and
wherein the processor is further configured to generate an image of the first area using the fourth image in addition to the first and second images or instead of the first and second images.

8. The image processing device of claim 1, wherein the processor is further configured to transmit, to a server, image data of an area specified by a passenger in the first area and receive, from the server, a type of a target included in the specified area and a visual object of the target.

9. An image processing device comprising:
a memory configured to store a first image transmitted from a first camera and a second image transmitted from a second camera with a wider view angle than the first camera; and
a processor configured to process the first and second images stored in the memory,
wherein the processor is configured to:
based on a target being specified in a first area in which the first image and the second image overlap each other within an augmented reality screen generated based on at least one of the first image or the second image, extract target information regarding the target based on data for the first image;
generate augmented reality data based on the extracted target information so that a visual object corresponding to the target is displayed on the first area; and
based on the target exiting the first area and entering a second area of the augmented reality screen, track a position of the target based on the extracted target information and generate the augmented reality data so that the visual object is displayed on the second area,
wherein the processor is further configured to specify a target included in the first image based on input information obtained from a passenger,
wherein the input information includes at least one of voice information, gaze information, gesture information, or touch information of the passenger, and
wherein the processor is further configured to:
obtain the voice information from the passenger,
obtain the gaze information of the passenger based on the voice information, and
specify a target corresponding to the gaze information in the first image.

10. An image processing method comprising:
receiving a first image and a second image from a first camera and a second camera with a wider view angle than the first camera, respectively;
based on a target being specified in a first area in which the first image and the second image overlap each other within an augmented reality screen generated based on at least one of the first image or the second image, extracting target information regarding the target based on data for the first image;
generating augmented reality data based on the extracted target information so that a visual object corresponding to the target is displayed on the first area; and
based on the target exiting the first area and entering a second area of the augmented reality screen, tracking a position of the target based on the extracted target information and generating the augmented reality data so that the visual object is displayed on the second area,
configuring the augmented reality screen to fit a screen size of a display based on the first image and the second image, wherein the augmented reality screen is configured to include (i) the first area in which the first image and the second image overlap each other and (ii) the second area in which the first image and the second image do not overlap each other,
wherein configuring the augmented reality screen comprises:
cropping upper and lower portions of the first area, in which the first image and the second image overlap each other;
generating left and right portions of the first area as the second area in an area in which the first image and the second image do not overlap each other; and
generating, in the second area, symbol images for objects of the second area.

11. The image processing method of claim 10, further comprising:

receiving a third image from a third camera;
obtaining object information regarding objects in the second area from the third image; and
generating, as the augmented reality data, symbol images for the objects to be displayed on the second area based on the object information.

12. The image processing method of claim 10, wherein the target information includes one or more of a shape, a type, a position, or a distance of the target, and
    wherein a size of the visual object is changed based on a distance to the target or the type of the target.

13. The image processing method of claim 10, further comprising:
    based on the target entering the second area, correcting the position of the target in the second area based on the second image corresponding to the second area.

14. The image processing method of claim 10, further comprising:
    specifying a target included in the first image based on input information obtained from a passenger,
    wherein the input information includes at least one of voice information, gaze information, gesture information, or touch information of the passenger.

15. The image processing method of claim 10, further comprising:
    receiving a fourth image from a fourth camera; and
    generating an image of the first area using the fourth image in addition to the first and second images or instead of the first and second images.

16. The image processing method of claim 10, further comprising:
    Transmitting, to a server, image data of an area specified by a passenger in the first area; and
    receiving, from the server, a type of a target included in the specified area and a visual object of the target.

17. An image processing device comprising:
    a first camera configured to output a first image;
    a second camera that is configured to output a second image and that has a wider view angle than the first camera;
    a memory configured to store the first image and the second image;
    a processor configured to generate an augmented reality screen based on at least one of the first image or the second image stored in the memory and generate augmented reality data for a specified target in the first image; and
    a display configured to display the augmented reality data by overlapping the augmented reality data with the augmented reality screen,
    wherein the processor is further configured to:
        based on the target being specified in a first area in which the first image and the second image overlap each other within the augmented reality screen, extract target information regarding the target based on data for the first image;
        generate the augmented reality data based on the extracted target information so that a visual object corresponding to the target is displayed on the first area;
        based on the target exiting the first area and entering a second area of the augmented reality screen, track a position of the target based on the extracted target information; and
        generate the augmented reality data so that the visual object is displayed on the second area,
    wherein the processor is further configured to configure the augmented reality screen to fit a screen size of a display based on the first image and the second image,
    wherein the augmented reality screen is configured to include (i) the first area in which the first image and the second image overlap each other and (ii) the second area in which the first image and the second image do not overlap each other,
    wherein the processor is further configured to crop upper and lower portions of the first area, in which the first image and the second image overlap each other, and generate left and right portions of the first area as the second area in an area in which the first image and the second image do not overlap each other, and
    wherein the processor is further configured to generate, in the second area, symbol images for objects of the second area.

\* \* \* \* \*